(12) United States Patent
Hammerschmidt et al.

(10) Patent No.: US 12,276,560 B2
(45) Date of Patent: Apr. 15, 2025

(54) TORQUE MEASUREMENT USING METAMATERIAL TRACKS ALIGNED BY LOW-FRICTION STRUCTURE

(71) Applicant: Infineon Technologies AG, Neubiberg (DE)

(72) Inventors: Dirk Hammerschmidt, Finkenstein (AT); Christof Michenthaler, Feistritz an der Gail (AT)

(73) Assignee: Infineon Technologies AG, Neubiberg (DE)

( * ) Notice: Subject to any disclaimer, the term of this patent is extended or adjusted under 35 U.S.C. 154(b) by 151 days.

(21) Appl. No.: 18/323,461

(22) Filed: May 25, 2023

(65) Prior Publication Data
US 2024/0393198 A1 Nov. 28, 2024

(51) Int. Cl.
*G01L 3/08* (2006.01)
(52) U.S. Cl.
CPC ..................... *G01L 3/08* (2013.01)
(58) Field of Classification Search
CPC .......................................................... G01L 3/08
See application file for complete search history.

(56) References Cited

U.S. PATENT DOCUMENTS

| | | | |
|---|---|---|---|
| 7,395,724 B2* | 7/2008 | Bunyer ................ | G01L 3/10 73/862.339 |
| 11,287,338 B2* | 3/2022 | Hammerschmidt .... | G01L 3/105 |
| 11,408,977 B2* | 8/2022 | Hammerschmidt .... | G01S 13/06 |
| 11,435,245 B2* | 9/2022 | Hammerschmidt .... | G01L 3/105 |
| 11,698,311 B2* | 7/2023 | Schossmann .......... | B62J 45/411 73/862.325 |
| 11,788,910 B2* | 10/2023 | Schossmann ........... | G01L 5/221 73/862.325 |
| 2018/0154926 A1* | 6/2018 | Ohira ..................... | B62D 15/02 |
| 2021/0102853 A1 | 4/2021 | Hammerschmidt et al. | |

* cited by examiner

*Primary Examiner* — Freddie Kirkland, III
(74) *Attorney, Agent, or Firm* — Harrity & Harrity, LLP

(57) ABSTRACT

A torque measurement system includes a first rotatable carrier structure and a second rotatable carrier structure mechanically coupled to a shaft; a first metamaterial track coupled to and configured to co-rotate with the first rotatable carrier structure; a second metamaterial track coupled to and configured to co-rotate with the second rotatable carrier structure; and a low-friction material arranged between the first and the second rotatable carrier structures. The first and the second metamaterial tracks are spaced apart by a predetermined distance and are mutually coupled to each other by a torque-dependent coupling. Responsive to a torque applied to the shaft, the first metamaterial track is configured to undergo a rotational shift relative to the second metamaterial track. The low-friction material provides a low-friction rotational shift between the first rotatable carrier structure and the second rotatable carrier structure such that the predetermined distance is constant during the rotational shift.

24 Claims, 7 Drawing Sheets

TORQUE MEASUREMENT USING METAMATERIAL TRACKS ALIGNED BY LOW-FRICTION STRUCTURE

BACKGROUND

Vehicles feature numerous safety, body, and powertrain applications that rely on speed sensing, position sensing, and/or angle sensing, as well as torque measurements. For example, in a vehicle's Electronic Stability Program (ESP), magnetic angle sensors and linear Hall sensors can be used to measure steering angle and steering torque. Modern powertrain systems can rely on magnetic speed sensors for camshaft, crankshaft, and transmission applications, along with automotive pressure sensors, to achieve required $CO_2$ targets and smart powertrain solutions.

SUMMARY

In some implementations, a torque measurement system includes a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, wherein the second rotatable carrier structure is spaced apart from the first rotatable carrier structure; a first metamaterial track coupled to the first rotatable carrier structure and configured to co-rotate with the first rotatable carrier structure, wherein the first metamaterial track is arranged at least partially around the rotational axis; a second metamaterial track coupled to the second rotatable carrier structure and configured to co-rotate with the second rotatable carrier structure, wherein the second metamaterial track is arranged at least partially around the rotational axis, wherein the first metamaterial track and the second metamaterial track are spaced apart by a predetermined distance, wherein the first metamaterial track and the second metamaterial track are mutually coupled to each other by a torque-dependent coupling, thereby forming a mutually coupled structure, and wherein, in response to a torque applied to the rotational shaft, the first metamaterial track is configured to undergo a rotational shift relative to the second metamaterial track; and at least one low-friction material arranged between the first rotatable carrier structure and the second rotatable carrier structure, wherein the at least one low-friction material is configured to provide a low-friction rotational shift between the first rotatable carrier structure and the second rotatable carrier structure such that the predetermined distance is constant during the rotational shift of the first rotatable carrier structure relative to the second rotatable carrier structure.

In some implementations, a method of determining a torque applied to a rotatable shaft includes providing at least one low-friction material between a first rotatable carrier structure coupled to the rotatable shaft and a second rotatable carrier structure coupled to the rotatable shaft; providing a first metamaterial track on the first rotatable carrier structure such that the first metamaterial track is configured to rotate with the first rotatable carrier structure; providing a second metamaterial track on the second rotatable carrier structure such that the second metamaterial track is configured to rotate with the second rotatable carrier structure, wherein the first metamaterial track and the second metamaterial track form a mutually coupled structure; applying the torque to the rotatable shaft to induce a rotational shift of the first metamaterial track relative to the second metamaterial track, wherein the at least one low-friction material is configured to provide a low-friction rotational shift between the first rotatable carrier structure and the second rotatable carrier structure such that a predetermined distance between the first metamaterial track and the second metamaterial track is constant during the rotational shift of the first rotatable carrier structure relative to the second rotatable carrier structure; transmitting an electromagnetic transmit signal toward the mutually coupled structure while the torque is applied to the rotational shaft; converting, by the mutually coupled structure, the electromagnetic transmit signal into an electromagnetic receive signal; evaluating the electromagnetic receive signal; and determining the torque applied to the rotatable shaft based on the evaluated electromagnetic receive signal.

In some implementations, a torque measurement system includes a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, wherein the second rotatable carrier structure is spaced apart from the first rotatable carrier structure; a first metamaterial track coupled to the first rotatable carrier structure and configured to co-rotate with the first rotatable carrier structure, wherein the first metamaterial track is arranged at least partially around the rotational axis; a second metamaterial track coupled to the second rotatable carrier structure and configured to co-rotate with the second rotatable carrier structure, wherein the second metamaterial track is arranged at least partially around the rotational axis, wherein the first metamaterial track and the second metamaterial track are spaced apart by a predetermined distance, wherein the first metamaterial track and the second metamaterial track are mutually coupled to each other by a torque-dependent coupling, thereby forming a mutually coupled structure, and wherein, in response to a torque applied to the rotational shaft, the first metamaterial track is configured to undergo a rotational shift relative to the second metamaterial track; and at least one structure arranged between the first rotatable carrier structure and the second rotatable carrier structure, wherein the at least one structure is mechanically not rigidly fixed to at least one of the first rotatable carrier structure or second rotatable carrier structure, wherein the at least one structure is configured to provide a low-friction rotational shift between the first rotatable carrier structure and the second rotatable carrier structure such that the predetermined distance is maintained constant during the rotational shift of the first rotatable carrier structure relative to the second rotatable carrier structure.

BRIEF DESCRIPTION OF THE DRAWINGS

Implementations are described herein making reference to the appended drawings.

DETAILED DESCRIPTION

Figure 1:
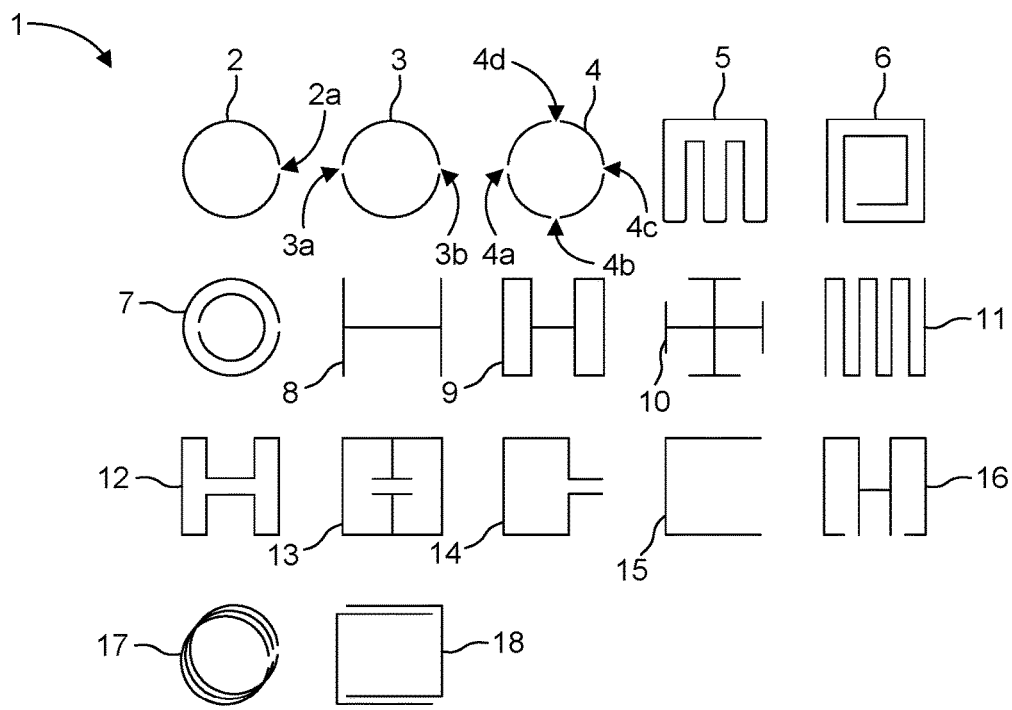
FIG. 1 illustrates example elementary structures according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Magnetic sensors may be used for speed sensing, position sensing, angle sensing, and/or torque sensing in various applications. However, a disadvantage of using magnetic sensors for speed sensing, position sensing, and/or angle sensing is that they are sensitive to magnetic disturbances. Magnetic disturbance fields are prevalent in vehicles such that magnetic measurements often have to endure harsh environments. This is especially problematic in hybrid and electric vehicles, where many wires and current rails carrying high currents can be located near a magnetic sensor system. Thus, magnetic disturbance fields generated by these high currents may influence the accuracy of magnetic measurements obtained by a magnetic sensor for speed sensing, position sensing, and/or angle sensing.

Alternatively, a torque sensor may use electromagnetic waves to perform a torque measurement using metamaterial targets for contactless sensor readout. The torque sensor may rely on two metamaterial tracks that are spaced apart by a lateral distance and are mutually coupled to each other by a torque-dependent coupling, such as a capacitive field coupling and/or an inductive field coupling. For example, a first metamaterial track may be coupled to and configured to co-rotate with a first rotatable carrier structure, and a second metamaterial track may be coupled to and configured to co-rotate with a second rotatable carrier structure. When a torque is applied, the first and second metamaterial tracks may undergo a torque-dependent rotational shift relative to each other. The torque-dependent rotational shift may be measured using electromagnetic waves directed at the two metamaterial tracks and translated into a torque measurement.

However, the torque measurement is dependent on the lateral distance between the two metamaterial tracks being maintained constant during the torque-dependent rotational shift. For example, a small deviation from a target lateral distance between the two metamaterial tracks would cause a significant change in a coupling factor of the two metamaterial tracks. Friction between the first rotatable carrier structure and the second rotatable carrier structure may contribute to fluctuations in the lateral distance between the two metamaterial tracks during the torque-dependent rotational shift. The change in the coupling factor may result not only in measurement errors but may also cause the torque measurement to depend on a rotation angle, which, to compensate for, would require additional complexity in circuitry and processing and lead to an increase in cost. Therefore, the torque measurement is vulnerable to errors if the lateral distance between the two metamaterial tracks changes during the torque-dependent rotational shift.

Some implementations disclosed herein are directed to an electromagnetic wave sensor and mm-wave systems that include an electromagnetic wave transmitter, an electromagnetic wave receiver, and/or an electromagnetic wave transceiver that are insensitive to magnetic disturbance fields. The electromagnetic wave sensor or electromagnetic wave system may be used for torque sensing. In some implementations, a first metamaterial track may be coupled to and configured to co-rotate with a first rotatable carrier structure, and a second metamaterial track may be coupled to and configured to co-rotate with a second rotatable carrier structure. The first metamaterial track and the second metamaterial track are spaced apart by a predetermined distance. When a torque is applied, the first and second metamaterial tracks may undergo a torque-dependent rotational shift relative to each other. The torque-dependent rotational shift may be measured using electromagnetic waves directed at the two metamaterial tracks and translated into a torque measurement. In addition, at least one low-friction material or structure may be arranged between the first rotatable carrier structure and the second rotatable carrier structure. The at least one low-friction material or structure may be configured to provide a low-friction rotational shift between the first rotatable carrier structure and the second rotatable carrier structure such that the predetermined distance is constant during the rotational shift of the first rotatable carrier structure relative to the second rotatable carrier structure (e.g., during the rotational shift of the first metamaterial track relative to the second metamaterial track). As a result, the at least one low-friction material or structure may prevent errors from occurring in the torque measurement, without a significant increase in complexity or cost.

FIG. 1 illustrates example elementary structures according to one or more implementations. The elementary structures 1 include a split ring resonator 2 having one capacitor coupling 2a, a split ring resonator 3 having two capacitor couplings 3a and 3b, a split ring resonator 4 having four capacitor couplings 4a-4d, an antenna structure 5, an antenna coil 6, a nested split ring resonator 7, an antenna structure 8, an antenna structure 9, an antenna structure 10, a transmission line structure 11, an antenna structure 12, a coupled split ring resonator 13, a split ring resonator 14, a partial ring or coupling structure 15, a coupled split ring resonator 16, a stacked split ring resonator structure 17, and a split ring resonator 18. In some implementations, the elementary structures may be sensitive to mm-waves.

Mm-waves are radio waves designated in the band of radio frequencies in the electromagnetic spectrum from 30 to 300 gigahertz (GHz), and may also be used as radar waves. Thus, a mm-wave sensor, system, transmitter, receiver, or transceiver described herein may also be regarded as a radar sensor, system, transmitter, receiver, or transceiver, and a mm-wave may be regarded as a radar signal. However, some implementations may also be applied in applications different from radar, such as radio frequency (RF) transmitters, receivers, or transceivers of RF devices. In fact, any RF circuitry may take advantage of the concepts described herein. A mm-wave sensor or mm-wave system may be configured, for example, as an angle sensor, a rotary position sensor, a linear position sensor, a speed sensor, a motion sensor, and/or a torque sensor.

A metamaterial is a material engineered to have a property that is not found in naturally occurring materials. The metamaterial is made from assemblies of multiple structural elements, also referred to as elementary structures, fashioned from composite materials such as metals or plastics. The structural elements may be arranged in repeating or periodic patterns, at scales that are smaller than the wavelengths of a phenomenon that the structural elements influence. In other words, metamaterials attain desired effects by incorporating structural elements of sub-wavelength sizes (e.g., features which are actually smaller than the wavelength of the electromagnetic waves that the structural elements affect).

As a result, metamaterials derive their properties not necessarily from the properties of the base materials, but from their designed structural elements. The precise shape, geometry, size, orientation, and arrangement of the structural elements gives the metamaterials their smart properties capable of manipulating electromagnetic waves (e.g., by blocking, reflecting, absorbing, enhancing, or bending waves) to achieve benefits. Thus, a metamaterial is an artificial composite that gains its electrical properties from its exactingly-designed structural elements and the arrangement of the structural elements relative to each other, rather than directly from materials of which the metamaterial is composed.

A metamaterial may be a subset of a larger group of heterogeneous structures composed of a base solid material and structural elements of a different material. The distinction of metamaterials is that they have special, sometimes anomalous, properties over a limited frequency band. For example, mm-wave metamaterials may exhibit special properties over a millimeter band of spectrum between 30 GHz and 300 GHz, as noted above.

In the context of the described implementations, a metamaterial is a 2D or three-dimensional (3D) array of elementary structures, which are coupled to each other. "Elementary structures," as used herein, may refer to discrete structures, element structures, or discrete element structures. In some cases, the elementary structures may be referred to simply as "structures." Elementary structures themselves may be composed of one or more conductive elements. When an elementary structure is composed of two or more conductive elements, the conductive elements may be mutually coupled to each other by, for example, a capacitive coupling, an inductive coupling, or a galvanic coupling. Additionally, the conductive elements of adjacent elementary structures may be mutually coupled to each other by, for example, a capacitive coupling, an inductive coupling, or a galvanic coupling.

The overall array of elementary structures provides macroscopic properties, which can be configured by the elementary structures used and their coupling paths. Metamaterials are configured for different kinds of waves like electromagnetic waves (e.g., optical, infrared (IR), and mm-waves) and mechanical waves (e.g., ultrasonic). The elementary structures and their grid pitch scale with the wavelength of a target frequency range (e.g., target frequency band).

Elementary structures in mm-wave metamaterials may include resonator elements, antenna elements, filter elements, waveguide elements, transmission line elements, or a combination thereof. An elementary structure size may range up to several wavelengths but is typically below one wavelength of a target frequency. Elementary structures may include parts that generate magnetic fields (e.g., conductor rings) and other parts that create electrical fields (e.g., gaps between conductors). Furthermore, elementary structure may also have elements that have electromagnetic wave properties, such as a short transmission line segment.

In general, elementary structures may electrically represent resistive-inductive-capacitive (RLC) networks. In a frequency range in which the elementary structures will be used, a characteristic of their resistive, inductive, and capacitive parameters is distributed over the geometry of the metamaterial. Since filters, resonators, transmission lines, and antennas can be differently-parametrized representatives of identical structures, it is often not possible to unambiguously assign a structure to a single group. Thus, it is to be understood that a structure described as a resonator can also be seen as antenna or a filter, depending on its use or implementation details. Furthermore, the behavior of a structure may also change with the frequency where it is operated, and a structure that behaves as a transmission line for one frequency may also expose a filter characteristic or create a resonance at another frequency of operation. Finally, the choice of the material impacts the behavior, which means that a choice of a better conductor will emphasize a resonant behavior, while a less conductive material will increase damping and make a filter characteristic dominant.

The transmission line structure 11 may be a damping structure or a delay structure. It may be used in an alternating configuration with resonators in order to establish an attenuated or phase-shifted coupling between the elementary structures instead of coupling directly. Coupling to the resonators can be capacitive or galvanic. The transmission line structure 11 may also extend onto a second layer, for example, with an identical structure creating a transmission line (e.g., two parallel wires).

The partial ring or coupling structure 15 may be referred to as a partial ring structure in the context of it being half of the split ring resonator 18. In this context, the partial ring structure 15 may be coupled to a second layer to form a resonator.

The elementary structures can be three-dimensional, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

The stacked split ring resonator structure 17 may have three split ring resonators stacked on top of each other. In some implementations, the stacked split ring resonator structure 17 may be formed by using three metallization layers stacked on top of each other.

The split ring resonator 18 may be made of two half-ring structures 15 that overlap, such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

In order to achieve a quasi-homogeneous macroscopic behavior, the elementary structures may be arranged in a 2D metamaterial array that may have dimensions that are larger than a wavelength of the target frequency range and include a plurality of elementary structures in each direction of the 2D metamaterial array.

As indicated above, FIG. 1 is provided as an example. Other examples may differ from what is described with regard to FIG. 1.

Figures 2A, 2B:
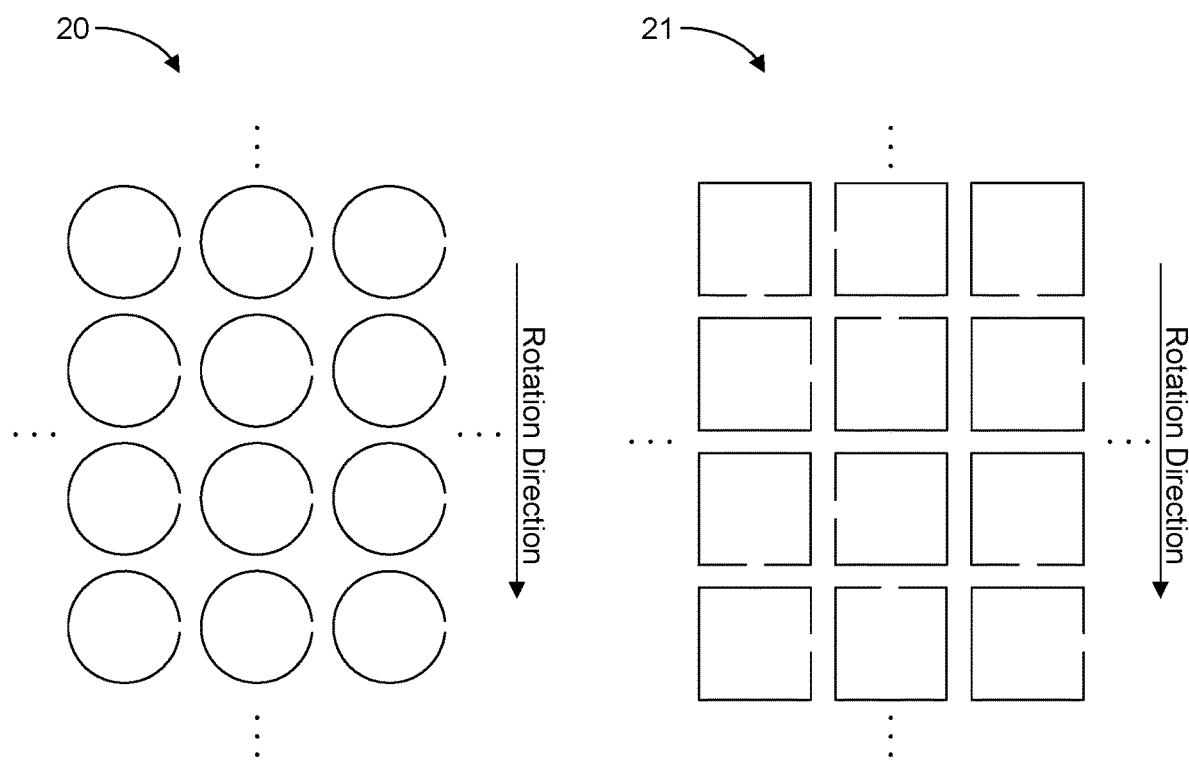
FIGS. 2A and 2B illustrate segments of example metamaterial tracks according to one or more implementations.

FIGS. 2A and 2B illustrate segments of example metamaterial tracks according to one or more implementations. A metamaterial track may be a strip of metamaterial that has elementary structures arranged in both widthwise (axial) and lengthwise (e.g., rotational or circumferential) dimensions of a polar coordinate system. Here, the direction orthogonal to a rotation direction may be referred to as an axial direction. The metamaterial track may be sensitive to a target frequency (e.g., resonance frequency) or a target frequency range (e.g., a resonance frequency range) of electromagnetic waves. For example, the metamaterial track may be a mm-wave metamaterial track that is sensitive to mm-waves.

For example, FIG. 2A shows an example of a 2D array 20 of split ring resonators, which are expected to extend further in both axial and rotation (e.g., circumferential) directions. However, it will be appreciated that the split ring resonators may be exchanged with any type of elementary structure (for example, with any of those shown in FIG. 1). Each split ring resonator comprises an open ring that represents an inductivity (L) and a gap or opening that provides a capacitive coupling (C). Thus, each split ring resonator may be a type of LC resonator.

The elementary structures that make up the segment of a metamaterial track shown in FIG. 2A may have a fixed arrangement or fixed property along the rotation direction. For example, the split ring resonators in each row may be arranged in the same position and orientation. Furthermore, the spacing between adjacent split ring resonators in the rotation direction may be fixed along the track. Accordingly, in some implementations, the 2D array 20 may not have any change in property of the elementary structures along the metamaterial track in the rotation direction. However, in some implementations, one or more properties between the elementary structures, such as spacing or orientation, may change in the axial direction and/or in the rotation direction.

There exists a mutual coupling of the elementary structures in the 2D array 20, which can be a capacitive coupling, an inductive coupling, or both. Here, both types of coupling are present in the 2D array 20. For example, capacitive coupling between the elementary structures exists in the vertical direction (e.g., along the rotation direction) on the sides where rings are close together. In addition, inductive coupling between the elementary structures is provided by a field generated by each split ring resonator.

Thus, electrically, the arrangement of the elementary structures in an array introduces a mutual coupling between the elementary structures, wherein the mutual coupling may include electric field coupling (e.g., capacitive near-field coupling), magnetic field coupling (e.g., inductive near-field coupling), waveguide coupling, or electromagnetic wave coupling (e.g., far-field coupling). Due to the dimensions of the arrays and depending on the type of elementary structures used, the coupling effect will typically be made up of a mixture of all mechanisms. The manner in which the structures are mutually coupled affects a coupling effect of the 2D array 20 or a portion of the 2D array 20. In turn, this coupling effect impacts an effect that individual elementary structures or a group of elementary structures have on an electromagnetic wave or signal that is incident on the elementary structure or the group of elementary structures. For example, the elementary structures of the metamaterial track may have a mm-wave property that affects a manner in which the elementary structures interact with a mm-wave. When an elementary structure or a group of elementary structures interacts with an initial mm-wave, the elementary structure or the group of elementary structures may cause the initial mm-wave to be converted, for example, by reflection and/or absorption, into a converted mm-wave that has a measurable property (e.g., a parameter value) that corresponds to a metamaterial characteristic of the elementary structure or the group of elementary structures. By way of example, the converted mm-wave may have an amplitude, a phase, or a frequency that corresponds to the metamaterial characteristic of the elementary structure or the group of elementary structures. In other words, the converted mm-wave may undergo a change in amplitude, phase, and/or frequency, relative to the initial mm-wave, that corresponds to the metamaterial characteristic of the elementary structure or the group of elementary structures that interact with the initial mm-wave. Thus, different coupling effects of the elementary structures may produce converted mm-waves having different values (e.g., a parameter values) of the measurable property.

Furthermore, the coupling effect between elementary structures may be different if gaps or openings of neighboring elementary structures are face-to-face, or if the gaps face (e.g., are adjacent to) a closed segment of a neighboring elementary structure. For example, FIG. 2B shows an example of 2D array 21 of split ring resonators in which an orientation of the split ring resonators changes in both the horizontal (width) and vertical (length) directions of the array 21 (e.g., of the metamaterial track). In other words, the locations of the gaps of the split ring resonators may vary across neighboring elementary structures, and the rows of elementary structures may have different patterns. Here, while not required, each row of elementary structures may have a unique pattern. As a result, the coupling effect between the elementary structures in FIG. 2B may be different than the coupling effect produced by the elementary structures shown in FIG. 2A.

Furthermore, the coupling effect between structures in FIG. 2B changes partially along the 2D array 21 in the rotation direction, whereas the coupling effect between the elementary structures in FIG. 2A does not change along the array in the rotation direction. The different shapes (circular versus rectangular) may also impact the characteristic of the structure itself and the coupling effect.

Each elementary structure may have a size (e.g., a width or diameter) of, for example, 10% to 100% of the wavelength of a transmitted electromagnetic wave to which the structure is sensitive. The 2D array 20 may be a single metallization layer disposed or printed on a film such that the 2D array 20 is two-dimensional. As noted above, multiple metallization layers may be stacked to form a 3D array.

Thus, arrays of elementary structures described herein include multiple repetitions of elementary structures having the same or differing arrangements with respect to each other that induce a property on a transmitted electromagnetic wave or signal incident thereon due to the coupling effect between the elementary structures.

A metamaterial track may be coupled to a target object (e.g., a rotatable carrier structure) such that the metamaterial track is arranged at least partly around a rotational axis. In some implementations, the metamaterial track may form a closed loop around the rotational axis, thereby forming a 360° periodical pattern. The elementary structures of the metamaterial track an array may have a 360° periodical pattern that may or may not change continuously around the circumference of the rotatable carrier structure and/or along a perimeter of the metamaterial track. For example, a metamaterial track used for a direct torque measurement may not have any change in property of the elementary structures along the metamaterial track in the rotation direction, such as the case for the 2D array 20. In contrast, metamaterial tracks used for an angle measurement, a rotational position change, or an indirect torque measurement may have a change in property of the elementary structures along the elementary track in the rotation direction. If the pattern of the elementary structures changes along the rotation direction, the pattern may change by continuously changing from 0° to 360° along the rotation direction of the metamaterial track, and then repeat.

There are diverse possibilities for changing a metamaterial property according to a 360° periodical pattern. It will also be appreciated that a rotational segment of less than 360° may also be applicable. For example, applications that measure limited angle ranges (e.g., a throttle valve, a chassis level, or a gas pedal) may also be used. In these cases, the pattern of the elementary structures need not be 360° periodic and may instead change over a smaller angular range (e.g., 45°, 60°, 90°, 180°, etc.). It naturally follows that the rotatable carrier structure also does not need to be a complete disc and can be a partial disc or an angular segment.

A property and/or arrangement of the metamaterial may be specific to an absolute angular position along the metamaterial track. Thus, in some implementations, the property of the metamaterial along the metamaterial track may also be specific to an absolute angular position of the rotatable carrier structure. An absolute angular position is an angular position relative to a reference (e.g., predetermined) angular position of the rotatable carrier structure. For example, the reference angular position may be zero degrees, and an absolute angular position may a specific angular position rotated from zero degrees over a 360° period. Thus, each absolute angular position has an absolute angular value from 0° to 360°.

As indicated above, FIGS. 2A and 2B are provided as examples. Other examples may differ from what is described with regard to FIGS. 2A and 2B.

Figure 3:
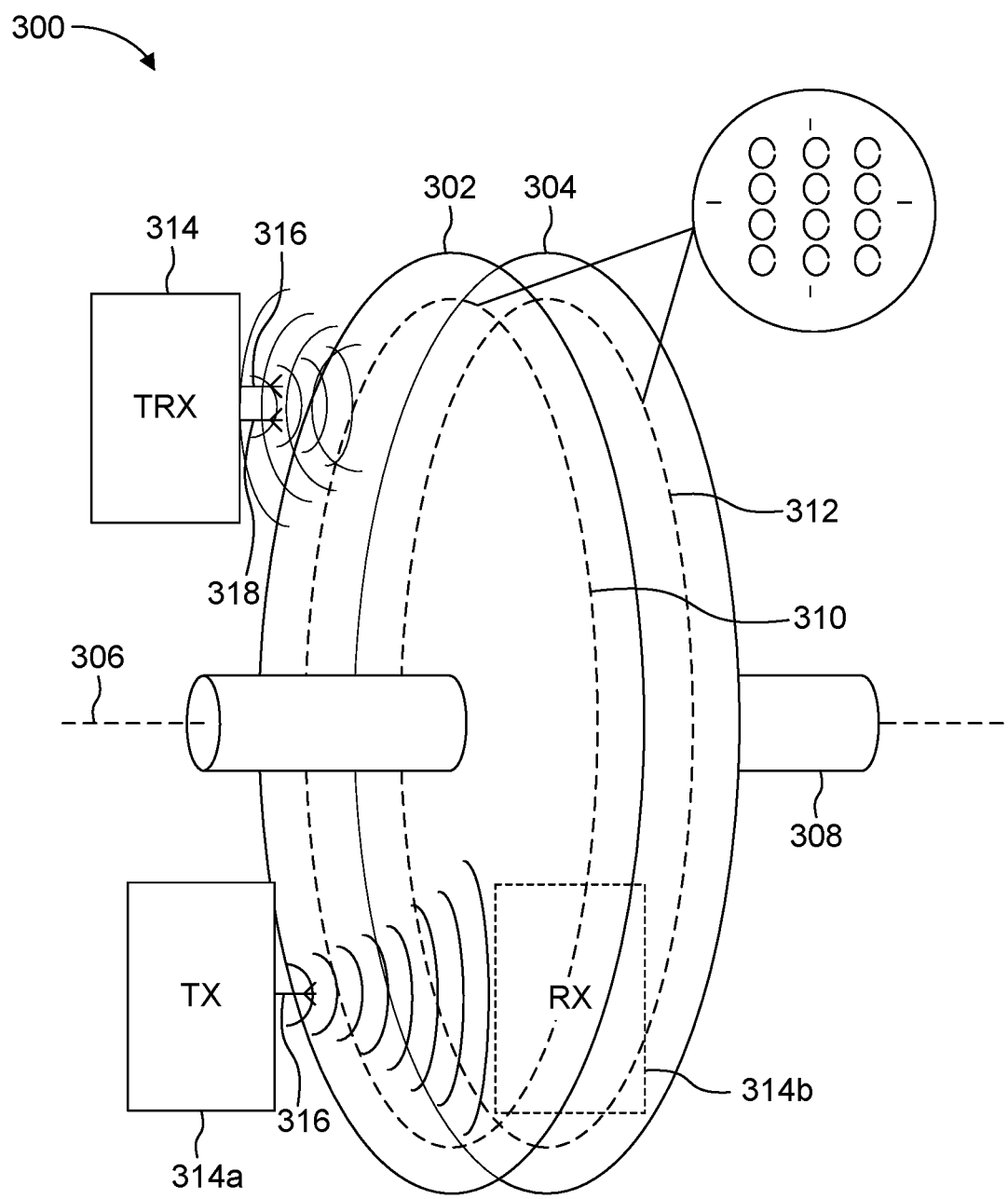
FIG. 3 is a schematic view of a torque measurement system according to one or more implementations.

FIG. 3 is a schematic view of a torque measurement system 300 according to one or more implementations. The torque measurement system 300 may include a first rotatable target object as a first rotatable carrier structure 302 and a second rotatable target object as a second rotatable carrier structure 304. The first rotatable carrier structure 302 and the second rotatable carrier structure 304 are configured to rotate about a rotational axis 306. The first rotatable carrier structure 302 and the second rotatable carrier structure 304 may be two discs or two wheels coupled to a rotational shaft 308 that extends in an axial direction along the rotational axis 306. As the rotational shaft 308 rotates, so do the first rotatable carrier structure 302 and the second rotatable carrier structure 304. The first rotatable carrier structure 302 and the second rotatable carrier structure 304 may represent mechanical targets for one or more mm-wave beams. Additionally, the first rotatable carrier structure 302 and the second rotatable carrier structure 304 are laterally separated from each other by a distance along the rotational shaft 308. For example, the first rotatable carrier structure 302 and the second rotatable carrier structure 304 may be laterally spaced apart from each other in a transmission direction (e.g., in the axial direction) of the mm-wave beams by a first defined lateral distance.

The torque measurement system 300 further includes a first metamaterial track 310 (e.g., a mm-wave metamaterial track) coupled to the first rotatable carrier structure 302 as a first metamaterial layer. The first metamaterial track 310 may form a closed loop around the rotational axis 306. The first metamaterial track 310 may be fixed to the first rotatable carrier structure 302 such that first metamaterial track 310 co-rotates with the first rotatable carrier structure 302 as the first rotatable carrier structure 302 rotates.

Additionally, the torque measurement system 300 further includes a second metamaterial track 312 (e.g., a mm-wave metamaterial track) coupled to the second rotatable carrier structure 304 as a second metamaterial layer. The second metamaterial track 312 may form a closed loop around the rotational axis 306. The second metamaterial track 312 may be fixed to the second rotatable carrier structure 304 such that second metamaterial track 312 co-rotates with the second rotatable carrier structure 304 as the second rotatable carrier structure 304 rotates.

The first metamaterial track 310 and the second metamaterial track 312 may have a same size and shape such that the two metamaterial tracks are substantially aligned with each other in the axial direction of the rotational axis 306. Thus, the first metamaterial track 310 and the second metamaterial track 312 are laterally separated by a distance along the rotational shaft 308. For example, the first rotatable carrier structure 302 and the second rotatable carrier structure 304 are laterally spaced apart from each other in the transmission direction (e.g., in the axial direction) of the mm-wave beams by a second defined lateral distance.

According to at least one implementation, the first metamaterial track 310 and the second metamaterial track 312 each have an array of elementary structures whose metamaterial properties do not change in the rotation direction, as explained above in reference to FIG. 2A. Furthermore, the first metamaterial track 310 and the second metamaterial track 312 are close enough to each other that the two metamaterial tracks 310 and 312 have a mutual coupling with each other that is induced by a field coupling effect (e.g., an electric field coupling, a magnetic field coupling, or an electromagnetic field coupling). As a result of the field coupling effect, the first metamaterial track 310 and the second metamaterial track 312 may form a resonant multi-track structure (e.g., a mutually coupled structure). The mutual coupling between the first metamaterial track 310 and the second metamaterial track 312 results in a torque-dependent behavior or interaction with a mm-wave, where the torque-dependent behavior or interaction is a torque-dependent reflection, a torque-dependent absorption, a torque-dependent transmission, or a torque-dependent combination of reflection, absorption, and/or transmission.

When torque is applied to the rotational shaft 308, the torque causes the rotational shaft 308 to rotate. In addition, the torque causes a torsional sheer stress within the rotational shaft 308, which causes different portions of the rotational shaft 308 along the rotation axis 306 to undergo a different amount of twisting or rotation. Because the first rotatable carrier structure 302 and the second rotatable carrier structure 304 are coupled to the rotational shaft 308 at different axial or lateral distances, the first rotatable carrier structure 302 and the second rotatable carrier structure 304 undergo different amounts or degrees of rotation. Therefore, when the rotational shaft 308 rotates due to the applied torque, there is a torque-dependent shift in angular position (e.g., an angular shift or a rotational shift) between the first rotatable carrier structure 302 and the second rotatable carrier structure 304. In other words, the first rotatable carrier structure 302 and the second rotatable carrier structure 304 rotate about the rotational shaft 308 by differing amounts based on an amount of torque applied to the rotational shaft 308.

Furthermore, because the first metamaterial track 310 is configured to co-rotate with the first rotatable carrier structure 302, and the second metamaterial track 312 is configured to co-rotate with the second rotatable carrier structure 304, the first metamaterial track 310 and the second metamaterial track 312 undergo the same torque-dependent shift in angular position (e.g., an angular shift or a rotational shift) based on the applied torque. In other words, the first metamaterial track 310 is configured to undergo a rotational shift relative to the second metamaterial track 312 based on the applied torque. This rotational shift results in a torque-dependent shift in the mutual coupling between the first metamaterial track 310 and the second metamaterial track 312. Since multiple metamaterial properties of the mutually coupled metamaterial tracks may change simultaneously in response to the applied torque that causes the rotational shift, multiple mm-wave properties of a mm-wave that is either transmitted, reflected, or emitted by the mutually coupled metamaterial tracks may depend on the applied torque. Two or more mm-wave properties of a same converted mm-wave or of different converted mm-waves may be evaluated to determine the applied torque. Alternatively, a single mm-property of two or more converted mm-waves may be evaluated to determine the applied torque.

An accuracy of a torque measurement may depend on the lateral distance between the first metamaterial track 310 and the second metamaterial track 312 being held constant during the rotational shift of the first metamaterial track 310 relative to the second metamaterial track 312. For example, a small deviation in the lateral distance between the first metamaterial track 310 and the second metamaterial track 312 may cause a change in a coupling factor between the two metamaterial tracks. The change in the coupling factor may change how the mutually coupled metamaterial tracks interact with a mm-wave and induce a change in one or more measurable properties (e.g., parameter values) of a measured mm-wave. For example, the change in the coupling factor between the two metamaterial tracks may cause a change in the amplitude, the phase, or the frequency of the converted mm-wave that is not dependent on the applied torque. Friction between the first rotatable carrier structure 302 and the second rotatable carrier structure 304 may contribute to fluctuations in the lateral distance between the first metamaterial track 310 and the second metamaterial track 312 during the torque-dependent rotational shift. The change in the coupling factor may result not only in measurement errors but may also cause the torque measurement to depend on a rotation angle, which would add complexity to the torque measurement system and lead to an increase in cost.

Accordingly, the torque measurement system 300 may further include at least one low-friction material or structure, shown in FIGS. 5-8, that is arranged between the first rotatable carrier structure 302 and the second rotatable carrier structure 304. The at least one low-friction material or structure may be configured to provide a low-friction rotational shift between the first rotatable carrier structure 302 and the second rotatable carrier structure 304 such that a predetermined distance between the first metamaterial track 310 and the second metamaterial track 312 is constant during the rotational shift of the first rotatable carrier structure 302 relative to the second rotatable carrier structure 304 (e.g., during the rotational shift of the first metamaterial track 310 relative to the second metamaterial track 312). As a result, the at least one low-friction material or structure may prevent errors from occurring in the torque measurement without a significant increase in complexity or cost.

In some implementations, the torque measurement system 300 further includes a transceiver (TRX) 314 configured to transmit and receive mm-waves. In some implementations, the torque measurement system 300 further includes a transmitter 314a and a receiver 314b configured to transmit and receive mm-waves. The transmitter 314a and the receiver 314b may be placed such that the first rotatable carrier structure 302 and the second rotatable carrier structure 304, and thus the first metamaterial track 310 and the second metamaterial track 312, are arranged between the transmitter 314a and the receiver 314b in the axial (lateral) direction.

The transceiver 314 may include a transmitter antenna 316 configured to transmit a mm-wave beam (e.g., an electromagnetic transmit wave) as a wireless electromagnetic wave focused at the first metamaterial track 310 and the second metamaterial track 312 (e.g., the mutually coupled structure). In the case that a separate transmitter 314a and receiver 314b are used, the transmitter 314a may be equipped with the transmitter antenna 316.

The transceiver 314 may also include a receiver antenna 318 configured to receive a partially-reflected mm-wave (e.g., an electromagnetic receive wave) as a wireless electromagnetic wave from the first metamaterial track 310 and the second metamaterial track 312 (e.g., the mutually coupled structure).

In some implementations, the transmitter antenna 316 of the transceiver 314 may be used as a transmit and receive antenna, and the transceiver 314 may include a splitter (e.g., a rat-race coupler or a hybrid ring coupler) that is configured to separate energy transmission paths of correspond RF signals. The splitter may be configured to direct a received wave from the receiver antenna 318 to receiver circuitry and direct a transmit signal from transmitter circuitry to the transmitter antenna 316 for transmission as a mm-wave.

In the case that a separate transmitter 314a and receiver 314b are used, the receiver 314b may be equipped with a receiver antenna 318. Here, the torque measurement system 300 may be configured to monitor mm-waves that pass through the two metamaterial tracks 310 and 312 (e.g., the mutually coupled structure) instead of monitoring reflected mm-waves, as is the case with the transceiver 314. As a result, the receiver antenna 318 may be configured to receive partially transmitted mm-waves (e.g., electromagnetic receive signals) as a result of the transmitted mm-wave interacting with (e.g., being partially absorbed by and transmitted through) the metamaterial tracks 310 and 312 (e.g., the mutually coupled structure).

Regardless of the configuration, it will be understood that at least one transmitter and at least one receiver is implemented for transmitting and receiving mm-wave beams. The transmitters and receivers may be electrically coupled to a system controller and/or a digital signal processor (DSP).

As noted above, the two metamaterial tracks 310 and 312 are close enough that the tracks have a mutual coupling (e.g., an electric field coupling, a magnetic field coupling, or an electromagnetic field coupling) with each other, thereby forming a resonant structure that results in a torque-dependent shift of the transmission or the reflection of a mm-wave that is caused by the resonant structure. The torque-dependent mutual coupling between the two metamaterial tracks 310 and 312 may be capacitive, inductive, or a combination of capacitive and inductive. In the latter case, one type of coupling may be dominant. For example, capacitive coupling or inductive coupling between the two metamaterial tracks 310 and 312 may be dominant.

As an example, the two metamaterial tracks 310 and 312 may be made up of elementary structures 15. The elementary structures 15 of the two metamaterial tracks 310 and 312 may be coupled together to form a split ring resonator 18 as an elementary structure having two poles, which is a resonator whose poles are modified by the rotational shift between the two metamaterial tracks 310 and 312 caused by the applied torque. Thus, the mutual coupling characteristic between the two metamaterial tracks 310 and 312 changes based on the rotational displacement that the two metamaterial tracks 310 and 312 undergo as a result of the applied torque. As a result, one or more properties (e.g., amplitude and/or phase) of the wave emitted from the resonant multitrack structure formed by the two metamaterial tracks 310 and 312 change based on the rotational displacement, which changes based on the applied torque.

In another example, the two metamaterial tracks 310 and 312 may be made up of elementary structures 2. The elementary structures 2 of the two metamaterial tracks 310 and 312 may be coupled together to form a stacked split ring resonator structure 17 having four poles (e.g., two poles for each elementary structure 2), which is a resonator whose poles are modified by the rotational shift between the two metamaterial tracks 310 and 312 caused by the applied torque. Thus, the mutual coupling characteristic between the two metamaterial tracks 310 and 312 may change based on the rotational displacement that the two metamaterial tracks 310 and 312 undergo as a result of the applied torque. As a result, one or more properties (e.g., amplitude and/or phase) of the wave emitted from the resonant multitrack structure formed by the two metamaterial tracks 310 and 312 changes based on the rotational displacement, which changes based on the applied torque.

It will be appreciated that other combinations of elementary structures may be used, forming different types of mutually coupled structures that have one or more characteristics that change based on the rotational displacement caused by the applied torque.

It should be noted that the mm-wave, being an electromagnetic wave, has an electrical field component that stimulates the capacitance of a metamaterial track or the resonant multitrack structure, and has a magnetic field component that stimulates the inductance of a metamaterial track or the resonant multitrack structure. Each elementary structure reflects a part of the mm-wave directly, transmits a part of the mm-wave directly, and receives a part of the energy and stores it in its resonance oscillation. The oscillation caused by the transmission radiates a part of the energy in either direction. Thus, each metamaterial track absorbs part of the energy and stores part of the energy of a mm-wave. Additionally, each metamaterial track eventually emits the energy that has been absorbed and stored.

The resonant multitrack structure, also referred to as a mutually coupled (multitrack) structure, may also be viewed as a single structure that emits a mm-wave, either as a reflection and/or a transmission, in response to the transmitted mm-wave from the transceiver 314 impinging thereon. This emitted wave may have a torque-dependent property that may be evaluated by the receiver circuit to determine the applied torque. For example, a phase shift and/or an amplitude shift of the received signal with respect to the transmitted mm-wave may be determined and evaluated to determine the applied torque.

In particular, when the rotational shaft 308 rotates, there is a torque-dependent shift in angular position (e.g., an angular shift or rotational shift) between the two metamaterial tracks 310 and 312 due to the torque applied to the rotational shaft 308. For example, the first rotatable carrier structure 302 and the second rotatable carrier structure 304 may rotate by different amounts due to the applied torque. As a result, the absolute angular position or discrete angular value corresponding to the first metamaterial track 310 may be different from the absolute angular position or discrete angular value corresponding to the second metamaterial track 312, resulting in an angular difference or angular shift that is proportional to the applied torque. The coupling effect between the two metamaterial tracks 310 and 312 is torque-dependent and changes based on their angular shift resultant from the applied torque. This change in coupling in turn impacts at least one coupling-dependent property of an electromagnetic wave interacting with the mutually coupled structure, which can be measured to determine the applied torque.

A processor of the receiver circuit may be configured to receive at least one electromagnetic wave from the mutually coupled structure and determine the applied torque based on one or more evaluated properties of the at least one received electromagnetic wave. The processor may determine the applied torque based on the evaluated property or properties using, for example, a look-up table or an algorithm.

For example, the electromagnetic wave emitted by the mutually coupled structure formed by the two metamaterial tracks 310 and 312 may have at least one property or a combination of properties unique to the angular shift between the two metamaterial tracks 310 and 312, and, thus, unique to the applied torque. This measurement technique may be referred to as a direct torque measurement.

Alternatively, the processor may receive an electromagnetic wave from each of the two metamaterial tracks 310 and 312, determine a torque-dependent absolute angular position corresponding to each metamaterial track, determine the angular difference therefrom, and then determine the applied torque based on the determined angular difference using, for example, a look-up table or an algorithm. In this case, the two metamaterial tracks 310 and 312 may have array elementary structures that vary in the rotation direction so that the angular position of each track can be determined. This measurement technique is referred to as an indirect torque measurement.

The transceiver 314 may use a direct torque measurement for measuring the applied torque. For instance, the transceiver 314 may transmit a continuous mm-wave as a carrier signal that has a constant frequency at the mutually coupled structure formed by the two metamaterial tracks 310 and 312. The mutually coupled structure may receive the carrier signal and may partially reflect the carrier signal back at the transceiver 314. The mutual coupling between the two metamaterial tracks 310 and 312 depends on the applied torque, which affects a torque-dependent property of the reflected signal. The transceiver 314 may include a demodulator that is configured to demodulate the received signal and a processor (e.g., a DSP) that is configured to evaluate a property of the received signal using at least one of phase analysis, amplitude analysis, or spectral analysis, and determine the applied torque based on the evaluated property. In particular, the processor may be configured to determine a phase and/or an amplitude of each received signal, and compare the determined phase and/or amplitude to the phase and/or amplitude of the carrier signal, respectively, to derive the applied torque. A certain change in phase or amplitude relative to the carrier signal (e.g., a phase shift or an amplitude shift) may correspond to the applied torque.

In summary, the torque measurement system 300 may include two target objects (e.g., the two rotatable carrier structures 302 and 304) each with a metamaterial pattern coupled to their neighboring surfaces. Each target object may be fixed to the rotational shaft 308 with a certain lateral distance therebetween. If a torque is applied to the rotational shaft 308, the rotational shaft 308 twists depending on a thickness and a Young's modulus of the rotational shaft 308. The lateral distance between the two target objects is close enough to ensure that the two metamaterial tracks 310 and 312 are mutually coupled. Depending on the rotational shift of the two metamaterial patterns of the two metamaterial tracks 310 and 312, the coupling effect between the two metamaterial tracks 310 and 312 changes. This coupling effect is unique to the amount of applied torque. As a result, the change in the coupling effect causes a property of one or more waves emitted from the metamaterial tracks 310 and 312 to be altered, which can be measured and analyzed for determining the applied torque.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
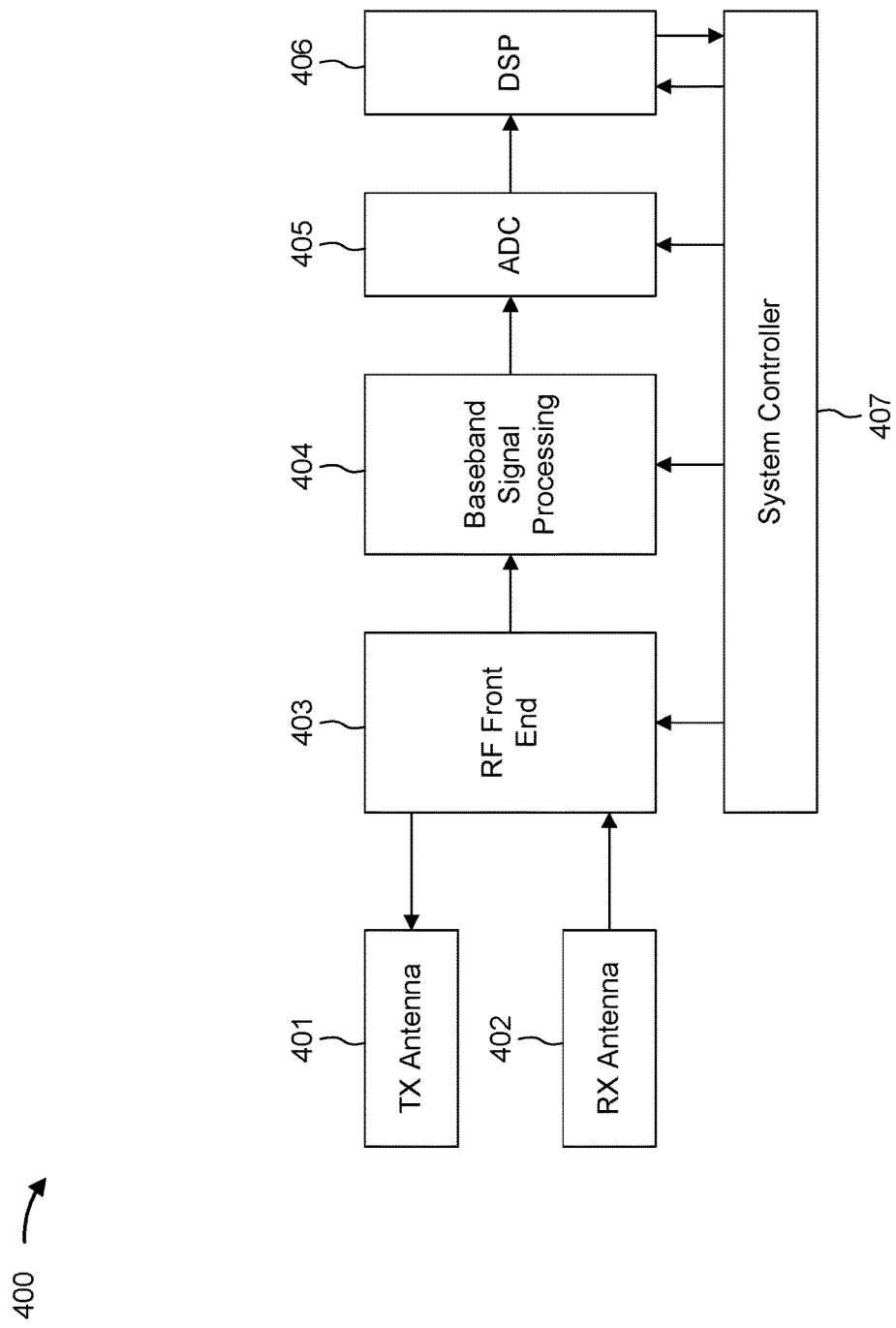
FIG. 4 illustrates an example transceiver circuit of a transceiver according to one or more implementations.

FIG. 4 illustrates an example transceiver circuit of a transceiver 400 according to one or more implementations. The transceiver 400 is representative of any transmitter/receiver combination. The transceiver 400 includes relevant transmitter circuitry and receiver circuitry corresponding to the implementations described herein. It will also be appreciated that the transmission circuitry and the receiver circuitry may be distributed between a transmitter and a receiver that are provided separate from each other.

Frequency modulation may be used on a transmitter side to characterize a transfer function of a transmission channel including the metamaterial over frequency. However, a continuous carrier wave with a constant frequency may also be used.

On the measurement side (e.g., a receiver side), measured properties may be magnitude (amplitude) and phase or in-phase and quadrature components (e.g., I and Q), which may be the most sophisticated and flexible solution. However, with respect to cost, a system with a constant frequency carrier may be preferable. In this case, a frequency may be chosen to be in a defined region with respect to poles and zeros where a phase or amplitude transfer function has a monotonous behavior with respect to the modified property of the metamaterial. Then, a local measurement of phase shift or amplitude attenuation may be used.

Accordingly, a TX antenna configuration 401 (e.g., at least one transmission antenna) and an RX antenna configuration 402 (e.g., at least one receiver antenna) are connected to an RF front end 403 integrated into a chip. The RF front end may contain circuit components that are used for RF signal processing. These circuit components may comprise, for example, a local oscillator (LO), RF power amplifiers, low noise amplifiers (LNA), directional couplers (e.g., rat-race couplers, circulators), and mixers for down-mixing (or down-converting) the RF signals into baseband or an intermediate frequency band (IF band). The RF front end 403 may—possibly together with further circuit components—be integrated into a chip, which may be referred to as a monolithic microwave integrated circuit (MMIC).

The example illustrated shows a bistatic (or pseudo-monostatic) radar system with separate reception (RX) and transmission (TX) antennas. In the case of a monostatic radar system, a single antenna may be used both to emit and to receive the electromagnetic (radar) signals. In this case, a directional coupler (e.g., a circulator) may be used to separate the RF signals to be emitted from the received RF signals (radar echo signals). Radar systems, in practice, usually have a plurality of transmission and reception channels (TX/RX channels) with a plurality of TX and RX antennas, which makes it possible, inter alia, to measure a direction of arrival (DoA) from which the radar echoes are received. In such multiple-input multiple-output (MIMO) systems, the individual TX channels and RX channels in each case usually have an identical or similar structure.

In the case of a frequency modulated continuous wave (FMCW) radar system, the RF signals emitted by the TX antenna configuration 401 may be, for example, in the range of approximately 10 GHz to 1 THz. However, the frequency bands that are applied here depend on the elementary structures to be used for the generation of the metamaterial target. As mentioned, the RF signal received by the RX antenna configuration 402 comprises the radar echoes (chirp echo signals)—that is to say, those signal components that are backscattered at one or at a plurality of radar targets. The received RF signal is down-mixed, for example, into baseband (or an IF band) and processed further in baseband by way of analog signal processing (see analog baseband signal processing circuitry 404) in order to determine a characteristic of the received RF signal, such as an amplitude, a frequency, or a phase shift.

The analog baseband signal processing circuitry 404 may comprise one or more filters and one or more amplifiers for filtering and amplifying the baseband signal. The baseband signal is digitized by an analog-to-digital converter (ADC) 405 and processed further in the digital domain. The digital signal processing chain may be implemented at least partly in the form of software that is able to be executed on a processor (for example a microcontroller, a DSP 406, or another computer unit).

The overall system is generally controlled by way of a system controller 407 that may likewise be implemented at least partly in the form of software that is able to be executed on a processor, such as, for example, a microcontroller. The RF front end 403 and the analog baseband signal processing circuitry 404 (optionally also the analog-to-digital converter 405) may be integrated together in a single MMIC (that is to say, an RF semiconductor chip). As an alternative, the individual components may also be distributed over a plurality of integrated circuits.

The DSP 406 may be configured to analyze measured values (e.g., parameter values) of one or more signals received from the two metamaterial tracks 310 and 312 to determine the applied torque.

The DSP 406 may be configured to perform the aforementioned phase analysis, amplitude analysis, and/or spectral analysis to determine an applied torque based on, for example, the determined amplitude modulation and/or phase modulation of the received signals. The phase modulation of a received signal may be a phase shift of the received signal with respect to a phase of the transmitted mm-wave. Similarly, the amplitude modulation of a received signal may be an amplitude shift of the received signal with respect to an amplitude of the transmitted mm-wave. The DSP 406 may be configured to determine a phase shift and/or an amplitude shift of a received signal and translate the shift into an angular shift between two metamaterial tracks 310 and 312 resultant from the applied torque to calculate the applied torque or directly translate the phase shift and/or an amplitude shift to the applied torque. For example, the DSP 406 may refer to a look-up table provided in memory that stores torque values corresponding to a specific amplitude modulation and/or phase modulation.

In some implementations, the DSP 406 may receive signals from two different mutually coupled structures (e.g., two pairs of metamaterial tracks), calculate a differential measurement value from the signals, and determine the applied torque based on the differential measurement value, for example, by using a look-up table in which differential measurement values are correlated to different applied torques.

As indicated above, FIG. 4 is provided as an example. Other examples may differ from what is described with regard to FIG. 4.

Figure 5:
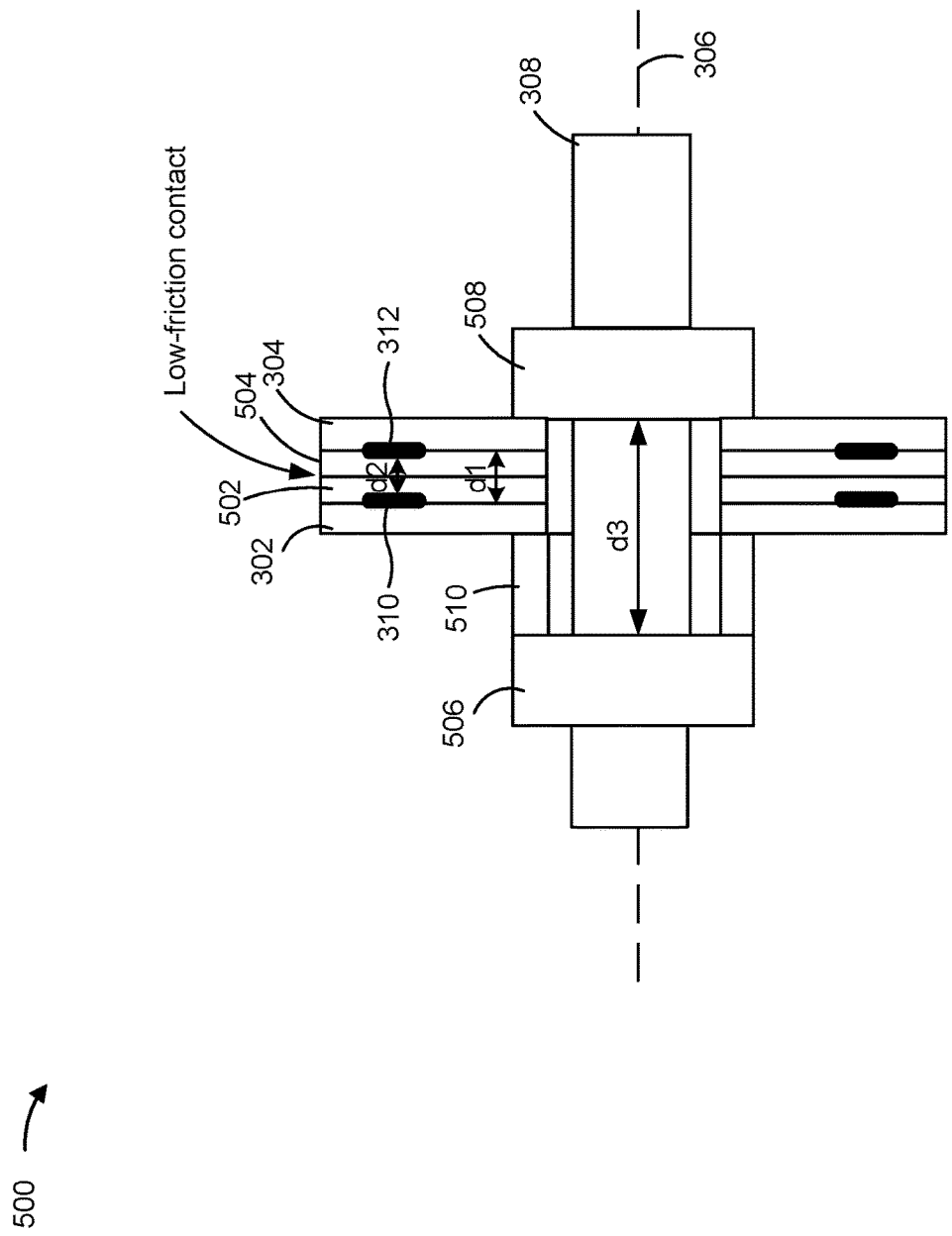
FIG. 5 is a cross-sectional view of a torque measurement system according to one or more implementations.

FIG. 5 is a cross-sectional view of a torque measurement system 500 according to one or more implementations. The torque measurement system 500 includes the first rotatable carrier structure 302 and the second rotatable carrier structure 304 fixed to the rotatable shaft 308 and separated by a first predetermined distance d1 in a lateral or axial direction. The torque measurement system 500 also includes the two metamaterial tracks 310 and 312 as similarly described above in connection with FIG. 3. The torque measurement system 700 is fabricated to ensure alignment of the two metamaterial tracks 310 and 312 as well as to ensure that a second predetermined distance d2 between the two metamaterial tracks 310 and 312 is constant during a rotational shift of the first rotatable carrier structure 302 relative to the second rotatable carrier structure 304 (e.g., during a rotational shift of the first metamaterial track 310 relative to the second metamaterial track 312). Thus, the two metamaterial tracks 310 and 312 are ensured to have a certain position relation with each other and a desired mutual coupling therebetween is achieved.

Mechanically, the two metamaterial tracks 310 and 312 are fixed to the rotational shaft 308 with a certain distance, since a winding angle under an applied torque increases proportionally with respect to a length of the rotational shaft 308 between the two metamaterial tracks 310 and 312. On the other hand, the two metamaterial tracks 310 and 312 are arranged within a coupling distance so that the two metamaterial tracks 310 and 312 form a mutually coupled structure. Furthermore, the mechanical arrangement may fix the two metamaterial tracks 310 and 312 in a defined zero-torque starting position (e.g., a reference position) with respect to each other so that a change from the zero-torque starting position can be measured.

The torque measurement system 500 may include at least one low-friction material or structure arranged between the first rotatable carrier structure 302 and the second rotatable carrier structure 304. The at least one low-friction material or structure may be configured to provide a low-friction rotational shift between the first rotatable carrier structure and the second rotatable carrier structure such that the predetermined distance d2 is constant during an entire rotational shift of the first rotatable carrier structure 302 relative to the second rotatable carrier structure 304 (e.g., during an entire rotational shift of the first metamaterial track 310 relative to the second metamaterial track 312).

In some implementations, the torque measurement system 500 may include a first low-friction material 502 coupled to the first rotatable carrier structure 302 and arranged between the first rotatable carrier structure 302 and the second rotatable carrier structure 304. In addition, the torque measurement system 500 may include a second low-friction material 504 coupled to the second rotatable carrier structure 304 and arranged between the first rotatable carrier structure 302 and the second rotatable carrier structure 304. The first low-friction material 502 and the second low-friction material 504 may be arranged to be in low-friction contact with each other.

The first low-friction material 502 and the second low-friction material 504 may have a low-friction coefficient that is sufficiently low such that the predetermined distance d2 is constant during the entire rotational shift of the first rotatable carrier structure 302 relative to the second rotatable carrier structure 304 (e.g., during the entire rotational shift of the first metamaterial track 310 relative to the second metamaterial track 312). For example, the first low-friction material 502 and the second low-friction material 504 may comprise silicon nitride (e.g., $Si_3N_4$), an amorphous a-CH material (e.g., graphite or carbon graphite), an atomic layer deposition material (e.g., aluminum oxide $Al_2O_3$), an oxide of a transition metal (e.g., titanium oxide $TiO_2$), a fluoro-organic material (e.g., polytetrafluoroethylene), a parylene material, or another organic material that has properties similar to fluoro-organic materials or parylene materials. The first low-friction material 502 and the second low-friction material 504 may be a grease (e.g., polytetrafluoroethylene grease). In some implementations, the friction coefficients of the first low-friction material 502 and the second low-friction material 504 may be less than 0.35.

In addition, the first low-friction material 502 and the second low-friction material 504 may be a dielectric material such that the two metamaterial tracks 310 and 312 are galvanically isolated from each other. The first low-friction material 502 and the second low-friction material 504 may be made of the same material or different material.

In addition, the first low-friction material 502 and the second low-friction material 504 may be a material that is transparent to electromagnetic waves (e.g., mm-waves) such that the mm-waves are unaffected by the first low-friction material 502 and the second low-friction material 504. In other words, it may be desirable that the first low-friction material 502 and the second low-friction material 504 be made of materials that do not alter a measurable property of the electromagnetic waves such that a wave modulation is solely dependent on the torque-dependent coupling of the two metamaterial tracks 310 and 312.

In some implementations, the first low-friction material 502 and the second low-friction material 504 may be low-friction coatings disposed on the first rotatable carrier structure 302 and the second rotatable carrier structure 304, respectively. Additionally, the low-friction coatings may be disposed on the two metamaterial tracks 310 and 312, respectively.

In some implementations, the first low-friction material 502 and the second low-friction material 504 may be low-friction spacers that are mechanically fixed to the first rotatable carrier structure 302 and the second rotatable carrier structure 304, respectively. Additionally, the low-friction spacers may be disposed on the two metamaterial tracks 310 and 312, respectively. For example, the first low-friction material 502 may be a first low-friction spacer that defines a first portion of the predetermined distance d2, and the second low-friction material 504 may be a second low-friction spacer that defines a second portion of the predetermined distance d2. In some implementations, the first low-friction material 502 may be in low-friction contact with the second low-friction material 504. In some implementations, an additional spacer may be arranged between the first low-friction material 502 and the second low-friction material 504 such that the first low-friction material 502 is in low-friction contact with a first side of the additional spacer and the second low-friction material 504 is in low-friction contact with a second side of the additional spacer that is arranged opposite to the first side of the additional spacer.

In some implementations, only one of the first low-friction material 502 or the second low-friction material 504 may be provided. For example, the first low-friction material 502 may be coupled to the first rotatable carrier structure 302 and may extend from the first rotatable carrier structure 302 to the second rotatable carrier structure 304. In this case, the first low-friction material 502 may be in low-friction contact with the second rotatable carrier structure 304 to provide the low-friction rotational shift between the first rotatable carrier structure 302 and the second rotatable carrier structure 304. As a result, the predetermined distance d2 is constant during an entire rotational shift of the first rotatable carrier structure 302 relative to the second rotatable carrier structure 304 (e.g., during an entire rotational shift of the first metamaterial track 310 relative to the second metamaterial track 312).

In some implementations, a spacer may be interposed between the first rotatable carrier structure 302 and the second rotatable carrier structure 304 that has a friction coefficient that is immaterial to the low-friction rotational shift. For example, the friction coefficient of the spacer may be greater than 0.35. In this case, the spacer may be mechanically fixed to the first rotatable carrier structure 302 or the second rotatable carrier structure 304. For example, the spacer may be used in place of the first low-friction material 502. As a result, the second low-friction material 504 may be arranged between the spacer and the second rotatable carrier structure 304 and may be configured to provide the low-friction rotational shift between the first rotatable carrier structure 302 and the second rotatable carrier structure 304.

Accordingly, at least one low-friction material may be arranged between the first rotatable carrier structure 302 and the second rotatable carrier structure 304 to provide the low-friction rotational shift between the first rotatable carrier structure 302 and the second rotatable carrier structure 304.

In addition, the first rotatable carrier structure 302 may be arranged in parallel with the second rotatable carrier structure 304. For example, both the first rotatable carrier structure 302 and the second rotatable carrier structure 304 may extend 90° from the rotational shaft 308 in the radial direction. The at least one low-friction material may be configured to maintain the first rotatable carrier structure 302 in parallel with the second rotatable carrier structure 304 during the rotational shift of the first rotatable carrier structure 302 relative to the second rotatable carrier structure 304. For example, the first low-friction material 502 and the second low-friction material 504 may be configured to maintain the first rotatable carrier structure 302 in parallel with the second rotatable carrier structure 304 during the rotational shift of the first rotatable carrier structure relative 302 to the second rotatable carrier structure 304. As a result, the predetermined distance d2 remains constant during an entire rotational shift of the first metamaterial track 310 relative to the second metamaterial track 312 when torque is applied to the rotational shaft 308.

In addition, the torque measurement system 500 may include two fixtures 506 and 508 that are each configured to fixedly couple (mechanically) a corresponding carrier structure 302 or 304 to the rotational shaft 308. Both fixtures 506 and 508 may be mechanically coupled to the rotational shaft 308. The fixture 506 represents a first point of attachment of the first rotatable carrier structure 302 to the rotational shaft 308. Additionally, the fixture 508 represents a second point of attachment of the second rotatable carrier structure 304 to the rotational shaft 308. The fixture 508 may fixedly couple (mechanically) the second rotatable carrier structure 304 directly to the rotational shaft 308. In some implementations, the fixture 506 may also be used to fixedly couple (mechanically) the first rotatable carrier structure 302 directly to the rotational shaft 308. However, in this example, an optional spacer ring 510 is used to fixedly couple (mechanically) the fixture 506 to the first rotatable carrier structure 302. The fixtures 506 and 508 and the optional spacer ring 510 may be made of a stiff material, such as steel. In some implementations, the optional spacer ring 510 may comprise at least one spring configured to provide a compression force onto at least one of the first rotatable carrier structure 302 or the second rotatable carrier structure 304 to maintain the predetermined distance d2.

By using the optional spacer ring 510, a larger distance d3 between attachment points on the rotational shaft 308 is achieved at which the first rotatable carrier structure 302 and the second rotatable carrier structure 304 are attached. The larger distance d3 may result in a larger angular shift between the first rotatable carrier structure 302 and the second rotatable carrier structure 304 as a result of an applied torque than if the first rotatable carrier structure 302 and the second rotatable carrier structure 304 were attached to the rotational shaft 308 at the predetermined distance d1. The angular shift between the first rotatable carrier structure 302 and the second rotatable carrier structure 304 is proportional to the lateral distance at which they are attached to the rotational shaft 308. Therefore, the larger distance d3 causes a more pronounced angular shift between the first rotatable carrier structure 302 and the second rotatable carrier structure 304. This in turn causes a larger shift in the mm-wave properties of a received wave detected at the receiver circuit that is easier to detect, measure, and translate into a torque value corresponding to the applied torque. As a result, the optional spacer ring 510 may facilitate the receiver circuit (e.g., the DSP 406) in obtaining a torque measurement.

As indicated above, FIG. 5 is provided as an example. Other examples may differ from what is described with regard to FIG. 5.

Figure 6:
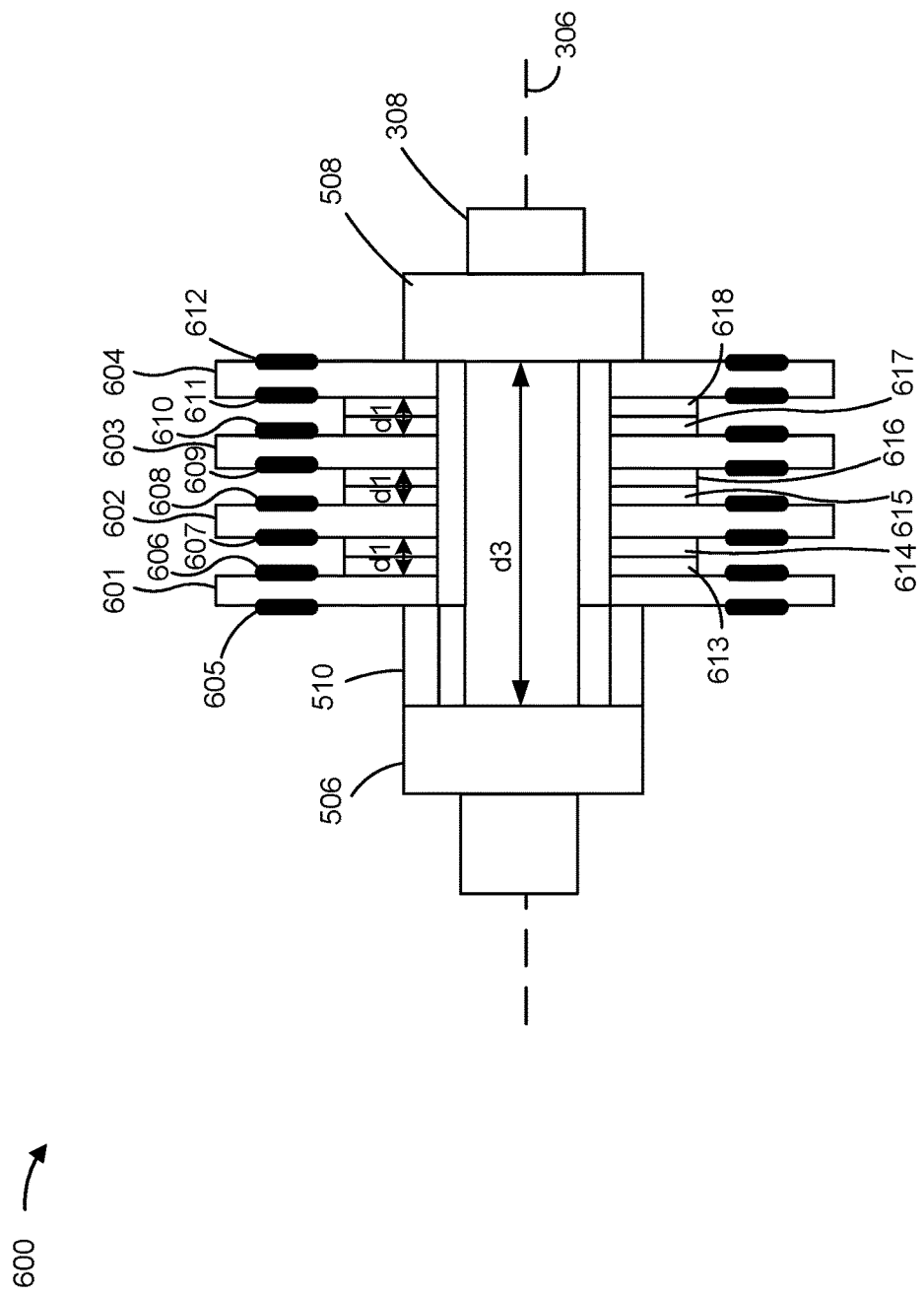
FIG. 6 is a cross-sectional view of a torque measurement system according to one or more implementations.

FIG. 6 is a cross-sectional view of a torque measurement system 600 according to one or more implementations. The torque measurement system 600 includes multiple rotatable carrier structures 601-604 that are fixed to the rotatable shaft 308 and are separated by a first predetermined distance d1 in a lateral or axial direction. Each rotatable carrier structure 601-604 includes a pair of metamaterial tracks such that metamaterial tracks 605-612 are coupled to the rotatable shaft 308 by a respective rotatable carrier structure. Each metamaterial track 605-612 may be respectively coupled to one or more neighboring metamaterial tracks by a respective torque-dependent coupling. Moreover, each metamaterial track 605-612 has a respective predefined distance to each of the other metamaterial tracks 605-612 that is configured to remain constant based on low-friction rotational shifts between each of the multiple rotatable carrier structures 601-604. A transmitter may be configured such that an electromagnetic transmit wave is incident on each of the metamaterial tracks 605-612, and a receiver may be configured to receive an electromagnetic receive wave that has been manipulated by the metamaterial tracks 605-612 for performing a torque measurement.

The torque measurement system 600 further includes at least one low-friction material arranged between neighboring pairs of the rotatable carrier structures 601-604. For example, two low-friction materials (e.g., coatings or spacers) may be arranged between each neighboring pair of the rotatable carrier structures 601-604. For example, low-friction materials 613 and 614 may be arranged between the rotatable carrier structures 601 and 602, low-friction materials 615 and 616 may be arranged between the rotatable carrier structures 602 and 603, and low-friction materials 617 and 618 may be arranged between the rotatable carrier structures 603 and 604, in a similar manner described above in connection with FIG. 5. The low-friction materials 613-618 are configured to maintain the rotatable carrier structures 601-604 in parallel with each other while torque is applied to the rotational shaft 308.

In some implementations, the low-friction materials 613-618 only extend to an inner diameter portion of the rotatable carrier structures 601-604 and do not extend to an outer diameter portion of the rotatable carrier structures 601-604 where the metamaterial tracks 605-612 are located. As a result, only air, which has no significant absorption or damping characteristic, is present between the metamaterial tracks 605-612. Alternatively, the low-friction materials 613-618 may extend fully to the outer diameter portion of the rotatable carrier structures 601-604 as long as the low-friction materials 613-618 do not affect the electromagnetic waves and/or the torque measurement.

As indicated above, FIG. 6 is provided as an example. Other examples may differ from what is described with regard to FIG. 6.

Figure 7:
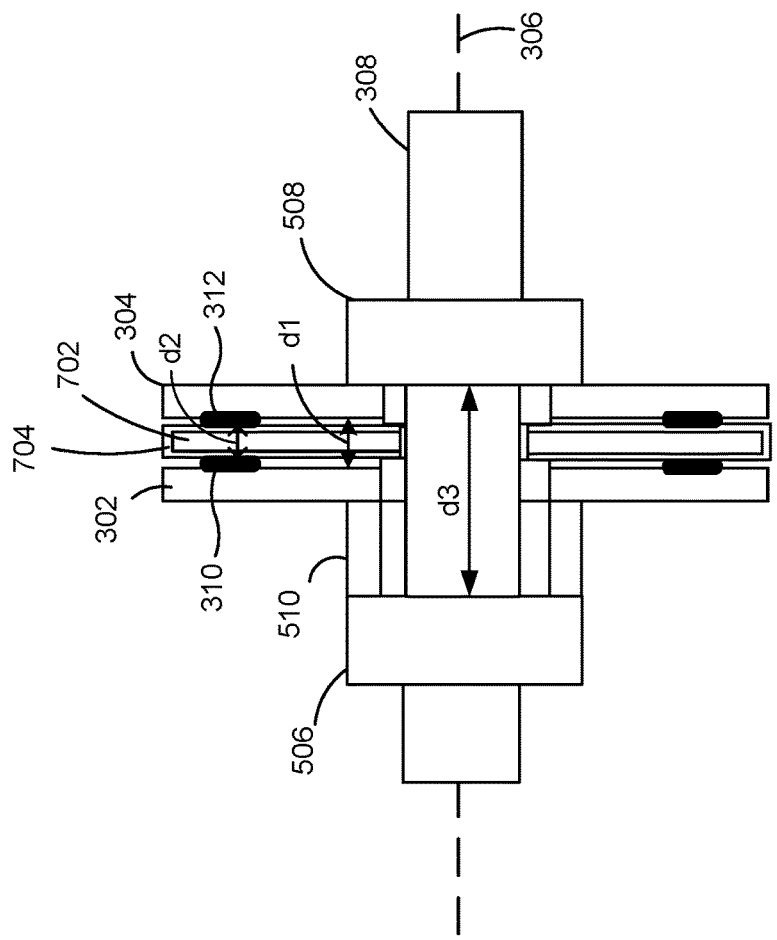
FIG. 7 is a cross-sectional view of a torque measurement system according to one or more implementations.

FIG. 7 is a cross-sectional view of a torque measurement system 700 according to one or more implementations. The torque measurement system 700 is similar to the torque measurement system 500 described in connection with FIG. 5, with the exception that the torque measurement system 700 includes a rigid spacer 702 interposed between the first rotatable carrier structure 302 and the second rotatable carrier structure 304. In addition, a low-friction material 704 is disposed on or otherwise coupled to the rigid spacer 702. For example, the low-friction material 704 is disposed on or otherwise coupled to at least opposing lateral sides of the rigid spacer 702 that are located between the first rotatable carrier structure 302 and the second rotatable carrier structure 304. In some implementations, the low-friction material 704 may be disposed on all sides of the rigid spacer 702. The rigid spacer 702 may be used to define the predetermined distance d1 between the first rotatable carrier structure 302 and the second rotatable carrier structure 304. Moreover, the low-friction material 704 may be in low-friction contact with the first rotatable carrier structure 302 and the second rotatable carrier structure 304 such that the low-friction material 704 provides a low-friction rotational shift between the first rotatable carrier structure 302 and the second rotatable carrier structure 304. As a result, the predetermined distance d2 is constant during the rotational shift of the first rotatable carrier structure 302 relative to the second rotatable carrier structure 304.

Alternatively, the low-friction material 704 may be disposed on the first rotatable carrier structure 302 and the second rotatable carrier structure 304 such that the low-friction material 704 provides low-friction contact between the first rotatable carrier structure 302 and the rigid spacer 702 and low-friction contact between the second rotatable carrier structure 304 and the rigid spacer 702. As a result, the predetermined distance d2 is constant during the rotational shift of the first rotatable carrier structure 302 relative to the second rotatable carrier structure 304.

In some implementations, a first low-friction spacer (e.g., first low-friction material 502) may be arranged between the first rotatable carrier structure 302 and the rigid spacer 702, and a second low-friction spacer (e.g., second low-friction material 504) may be arranged between the second rotatable carrier structure 304 and the rigid spacer 702. Thus, the first low-friction spacer may be configured to provide a first low-friction contact between the first rotatable carrier structure 302 and the rigid spacer 702, and the second low-friction spacer may be configured to provide a second low-friction contact between the second rotatable carrier structure 304 and the rigid spacer 702.

As indicated above, FIG. 7 is provided as an example. Other examples may differ from what is described with regard to FIG. 7.

Figure 8:
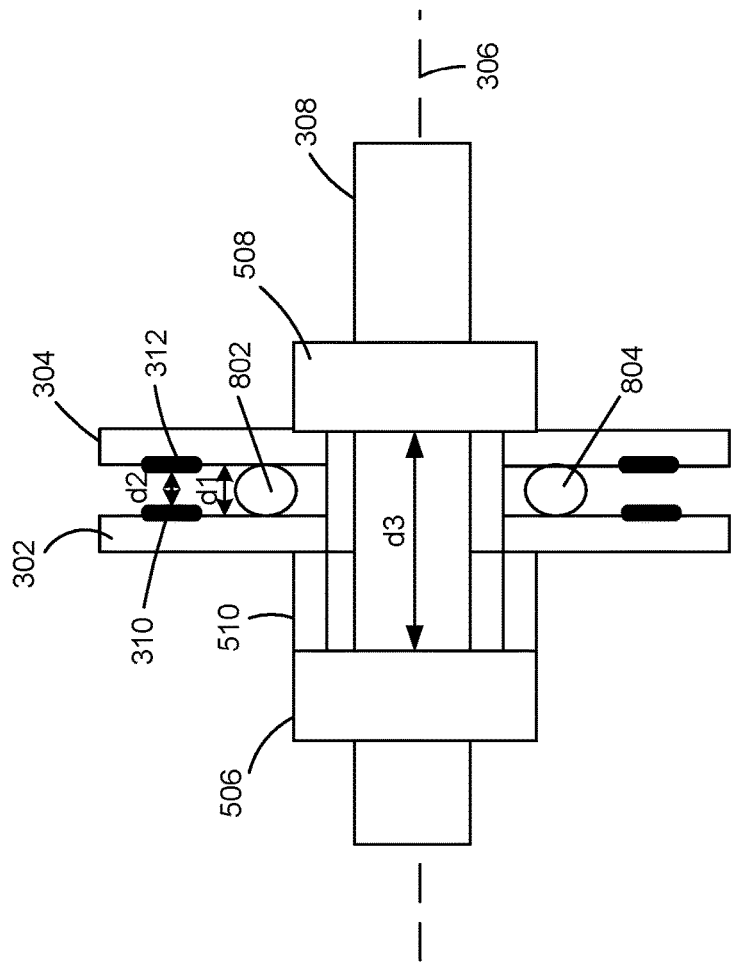
FIG. 8 is a cross-sectional view of a torque measurement system according to one or more implementations.

FIG. 8 is a cross-sectional view of a torque measurement system 800 according to one or more implementations. The torque measurement system 800 is similar to the torque measurement system 500 described in connection with FIG. 5, with the exception that the torque measurement system 800 includes at least one structure 802 and/or 804 arranged between the first rotatable carrier structure 302 and the second rotatable carrier structure 304 that define the predetermined distance d1. The structure 802 may be mechanically rigidly fixed or mechanically rigidly coupled to one of the first rotatable carrier structure 302 or the second rotatable carrier structure 304, and may be mechanically not rigidly fixed to the other one of the first rotatable carrier structure 302 or second rotatable carrier structure 304. Alternatively, the structure 802 may be mechanically not rigidly fixed or mechanically rigidly coupled to both the first rotatable carrier structure 302 and the second rotatable carrier structure 304. The structure 804 may be mechanically rigidly fixed or mechanically rigidly coupled to one of the first rotatable carrier structure 302 or the second rotatable carrier structure 304, and may be mechanically not rigidly fixed to the other one of the first rotatable carrier structure 302 or second rotatable carrier structure 304. Alternatively, the structure 804 may be mechanically not rigidly fixed or mechanically rigidly coupled to both the first rotatable carrier structure 302 and the second rotatable carrier structure 304.

Consequently, the structure 802 may be in low-friction contact with at least one of the first rotatable carrier structure 302 or second rotatable carrier structure 304, and the structure 804 may be in low-friction contact with at least one of the first rotatable carrier structure 302 or second rotatable carrier structure 304. Therefore, the structures 802 and 804 may provide a low-friction rotational shift between the first rotatable carrier structure 302 and the second rotatable carrier structure 304 such that the predetermined distance is maintained constant during the rotational shift of the first rotatable carrier structure 302 relative to the second rotatable carrier structure 304. The structures 802 and 804 are configured to maintain the first rotatable carrier structure 302 in parallel with the second rotatable carrier structure 304 during the rotational shift of the first rotatable carrier structure 302 relative to the second rotatable carrier structure 304.

The structures 802 and 804 may be bearings (e.g., ball bearings, thrust bearings, or roller bearings) that are arranged in contact with at least one of the first rotatable carrier structure 302 or the second rotatable carrier structure 304.

As indicated above, FIG. 8 is provided as an example. Other examples may differ from what is described with regard to FIG. 8.

The following provides an overview of some Aspects of the present disclosure:

Aspect 1: A torque measurement system, comprising: a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, wherein the second rotatable carrier structure is spaced apart from the first rotatable carrier structure; a first metamaterial track coupled to the first rotatable carrier structure and configured to co-rotate with the first rotatable carrier structure, wherein the first metamaterial track is arranged at least partially around the rotational axis; a second metamaterial track coupled to the second rotatable carrier structure and configured to co-rotate with the second rotatable carrier structure, wherein the second metamaterial track is arranged at least partially around the rotational axis, wherein the first metamaterial track and the second metamaterial track are spaced apart by a predetermined distance, wherein the first metamaterial track and the second metamaterial track are mutually coupled to each other by a torque-dependent coupling, thereby forming a mutually coupled structure, and wherein, in response to a torque applied to the rotational shaft, the first metamaterial track is configured to undergo a rotational shift relative to the second metamaterial track; and at least one low-friction material arranged between the first rotatable carrier structure and the second rotatable carrier structure, wherein the at least one low-friction material is configured to provide a low-friction rotational shift between the first rotatable carrier structure and the second rotatable carrier structure such that the predetermined distance is constant during the rotational shift of the first rotatable carrier structure relative to the second rotatable carrier structure.

Aspect 2: The torque measurement system of Aspect 1, wherein the first rotatable carrier structure is arranged in parallel with the second rotatable carrier structure, and wherein the at least one low-friction material is configured to maintain the first rotatable carrier structure in parallel with the second rotatable carrier structure during the rotational shift of the first rotatable carrier structure relative to the second rotatable carrier structure.

Aspect 3: The torque measurement system of any of Aspects 1-2, wherein the at least one low-friction material includes: a first low-friction material coupled to the first rotatable carrier structure and arranged between the first rotatable carrier structure and the second rotatable carrier structure, and a second low-friction material coupled to the second rotatable carrier structure and arranged between the first rotatable carrier structure and the second rotatable carrier structure.

Aspect 4: The torque measurement system of Aspect 3, wherein the first low-friction material is a first low-friction coating disposed on the first rotatable carrier structure, and wherein the second low-friction material is a second low-friction coating disposed on the second rotatable carrier structure.

Aspect 5: The torque measurement system of Aspect 4, wherein the first low-friction coating is disposed on the first metamaterial track, and wherein the second low-friction coating is disposed on the second metamaterial track.

Aspect 6: The torque measurement system of Aspect 4, wherein the first low-friction coating is in contact with the second low-friction coating.

Aspect 7: The torque measurement system of Aspect 3, wherein the first low-friction material is a first low-friction spacer that defines a first portion of the predetermined distance, and the second low-friction material is a second low-friction spacer that defines a second portion of the predetermined distance.

Aspect 8: The torque measurement system of Aspect 7, wherein the first low-friction spacer is in contact with the second low-friction spacer.

Aspect 9: The torque measurement system of Aspect 7, wherein the first low-friction spacer is made of a first dielectric material and the second low-friction spacer is made of a second dielectric material.

Aspect 10: The torque measurement system of any of Aspects 1-9, further comprising: a spacer interposed between the first rotatable carrier structure and the second rotatable carrier structure, wherein the spacer is mechanically fixed to the first rotatable carrier structure, and wherein the at least one low-friction material is arranged between the spacer and the second rotatable carrier structure.

Aspect 11: The torque measurement system of any of Aspects 1-10, further comprising: a rigid spacer interposed between the first rotatable carrier structure and the second rotatable carrier structure, wherein the at least one low-friction material is arranged between the rigid spacer and the first rotatable carrier structure and between the rigid spacer and the second rotatable carrier structure.

Aspect 12: The torque measurement system of Aspect 11, wherein the at least one low-friction material is a low-friction coating disposed on the rigid spacer or disposed on the first rotatable carrier structure and the second rotatable carrier structure.

Aspect 13: The torque measurement system of Aspect 11, wherein the at least one low-friction material includes: a first low-friction spacer that is configured to provide a first low-friction mechanical contact between the first rotatable carrier structure and the rigid spacer, and a second low-friction spacer that is configured to provide a second low-friction mechanical contact between the second rotatable carrier structure and the rigid spacer.

Aspect 14: The torque measurement system of any of Aspects 1-13, wherein the at least one low-friction material is transparent to millimeter (mm)-waves such that the mm-waves are unaffected by the at least one low-friction material.

Aspect 15: The torque measurement system of any of Aspects 1-14, further comprising: a transmitter configured to transmit an electromagnetic transmit wave toward the mutually coupled structure, wherein the mutually coupled structure is arranged to convert the electromagnetic transmit wave into an electromagnetic receive wave based on the torque applied to the rotational shaft; and a receiver configured to receive the electromagnetic receive wave and determine the torque applied to the rotational shaft based on the electromagnetic receive wave.

Aspect 16: The torque measurement system of Aspect 15, wherein the torque-dependent coupling includes at least one of a capacitive near-field coupling, an inductive near-field coupling, a waveguide coupling, or a far-field coupling.

Aspect 17: The torque measurement system of Aspect 15, wherein the torque-dependent coupling affects a millimeter (mm)-wave property of the mutually coupled structure such that the mm-wave property changes based on the torque applied to the rotational shaft.

Aspect 18: The torque measurement system of Aspect 15, wherein: the mutually coupled structure is configured to modify the electromagnetic transmit wave based on the torque-dependent coupling, thereby producing the electromagnetic receive wave having a parameter value that is unique to the torque applied to the rotational shaft.

Aspect 19: The torque measurement system of any of Aspects 1-18, wherein, in response to the torque applied to the rotational shaft, the first metamaterial track and the second metamaterial track are configured to rotate about the rotational axis by differing amounts causing a torque-dependent shift in angular position between the first metamaterial track and the second metamaterial track and resulting in a torque-dependent change to the torque-dependent coupling.

Aspect 20: The torque measurement system of any of Aspects 1-19, wherein the predetermined distance is a first predetermined distance, wherein the first rotatable carrier structure is mechanically coupled to the rotational shaft at a first point of attachment and the second rotatable carrier structure is mechanically coupled to the rotational shaft at a second point of attachment, and wherein the first point of attachment and the second point of attachment are spaced apart by a second predetermined distance that is greater than the first predetermined distance.

Aspect 21: The torque measurement system of any of Aspects 1-20, further comprising: at least one spring configured to provide a compression force onto at least one of the first rotatable carrier structure or the second rotatable carrier structure to maintain the predetermined distance.

Aspect 22: A method of determining a torque applied to a rotatable shaft, the method comprising: providing at least one low-friction material between a first rotatable carrier structure coupled to the rotatable shaft and a second rotatable carrier structure coupled to the rotatable shaft; providing a first metamaterial track on the first rotatable carrier structure such that the first metamaterial track is configured to rotate with the first rotatable carrier structure; providing a second metamaterial track on the second rotatable carrier structure such that the second metamaterial track is configured to rotate with the second rotatable carrier structure, wherein the first metamaterial track and the second metamaterial track form a mutually coupled structure; applying the torque to the rotatable shaft to induce a rotational shift of the first metamaterial track relative to the second metamaterial track, wherein the at least one low-friction material is configured to provide a low-friction rotational shift between the first rotatable carrier structure and the second rotatable carrier structure such that a predetermined distance between the first metamaterial track and the second metamaterial track is constant during the rotational shift of the first rotatable carrier structure relative to the second rotatable carrier structure; transmitting an electromagnetic transmit signal toward the mutually coupled structure while the torque is applied to the rotational shaft; converting, by the mutually coupled structure, the electromagnetic transmit signal into an electromagnetic receive signal; evaluating the electromagnetic receive signal; and determining the torque applied to the rotatable shaft based on the evaluated electromagnetic receive signal.

Aspect 23: A torque measurement system, comprising: a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, wherein the second rotatable carrier structure is spaced apart from the first rotatable carrier structure; a first metamaterial track coupled to the first rotatable carrier structure and configured to co-rotate with the first rotatable carrier structure, wherein the first metamaterial track is arranged at least partially around the rotational axis; a second metamaterial track coupled to the second rotatable carrier structure and configured to co-rotate with the second rotatable carrier structure, wherein the second metamaterial track is arranged at least partially around the rotational axis, wherein the first metamaterial track and the second metamaterial track are spaced apart by a predetermined distance, wherein the first metamaterial track and the second metamaterial track are mutually coupled to each other by a torque-dependent coupling, thereby forming a mutually coupled structure, and wherein, in response to a torque applied to the rotatable shaft, the first metamaterial track is configured to undergo a rotational shift relative to the second metamaterial track; and at least one structure arranged between the first rotatable carrier structure and the second rotatable carrier structure, wherein the at least one structure is mechanically not rigidly fixed to at least one of the first rotatable carrier structure or second rotatable carrier structure, wherein the at least one structure is configured to provide a low-friction rotational shift between the first rotatable carrier structure and the second rotatable carrier structure such that the predetermined distance is maintained constant during the rotational shift of the first rotatable carrier structure relative to the second rotatable carrier structure.

Aspect 24: The torque measurement system of Aspect 23, wherein the at least one structure includes at least one bearing arranged in contact with at least one of the first rotatable carrier structure or the second rotatable carrier structure.

Aspect 25: A system configured to perform one or more operations recited in one or more of Aspects 1-24.

Aspect 26: An apparatus comprising means for performing one or more operations recited in one or more of Aspects 1-24.

Aspect 27: A non-transitory computer-readable medium storing a set of instructions, the set of instructions comprising one or more instructions that, when executed by a device, cause the device to perform one or more operations recited in one or more of Aspects 1-24.

Aspect 28: A computer program product comprising instructions or code for executing one or more operations recited in one or more of Aspects 1-24.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A torque measurement system, comprising:
   a first rotatable carrier structure mechanically coupled to a rotational shaft and configured to rotate about a rotational axis in a rotation direction;
   a second rotatable carrier structure mechanically coupled to the rotational shaft and configured to rotate about the rotational axis in the rotation direction, wherein the second rotatable carrier structure is spaced apart from the first rotatable carrier structure;
   a first metamaterial track coupled to the first rotatable carrier structure and configured to co-rotate with the first rotatable carrier structure, wherein the first metamaterial track is arranged at least partially around the rotational axis;
   a second metamaterial track coupled to the second rotatable carrier structure and configured to co-rotate with the second rotatable carrier structure, wherein the second metamaterial track is arranged at least partially around the rotational axis,
      wherein the first metamaterial track and the second metamaterial track are spaced apart by a predetermined distance,
      wherein the first metamaterial track and the second metamaterial track are mutually coupled to each other by a torque-dependent coupling, thereby forming a mutually coupled structure, and
      wherein, in response to a torque applied to the rotational shaft, the first metamaterial track is configured to undergo a rotational shift relative to the second metamaterial track; and
   at least one low-friction material arranged between the first rotatable carrier structure and the second rotatable carrier structure,
      wherein the at least one low-friction material is configured to provide a low-friction rotational shift between the first rotatable carrier structure and the second rotatable carrier structure such that the predetermined distance is constant during the rotational shift of the first rotatable carrier structure relative to the second rotatable carrier structure.

2. The torque measurement system of claim 1, wherein the first rotatable carrier structure is arranged in parallel with the second rotatable carrier structure, and
   wherein the at least one low-friction material is configured to maintain the first rotatable carrier structure in parallel with the second rotatable carrier structure during the rotational shift of the first rotatable carrier structure relative to the second rotatable carrier structure.

3. The torque measurement system of claim 1, wherein the at least one low-friction material includes:
   a first low-friction material coupled to the first rotatable carrier structure and arranged between the first rotatable carrier structure and the second rotatable carrier structure, and
   a second low-friction material coupled to the second rotatable carrier structure and arranged between the first rotatable carrier structure and the second rotatable carrier structure.

4. The torque measurement system of claim 3, wherein the first low-friction material is a first low-friction coating disposed on the first rotatable carrier structure, and
   wherein the second low-friction material is a second low-friction coating disposed on the second rotatable carrier structure.

5. The torque measurement system of claim 4, wherein the first low-friction coating is disposed on the first metamaterial track, and
   wherein the second low-friction coating is disposed on the second metamaterial track.

6. The torque measurement system of claim 4, wherein the first low-friction coating is in contact with the second low-friction coating.

7. The torque measurement system of claim 3, wherein the first low-friction material is a first low-friction spacer that defines a first portion of the predetermined distance, and
   the second low-friction material is a second low-friction spacer that defines a second portion of the predetermined distance.

8. The torque measurement system of claim 7, wherein the first low-friction spacer is in contact with the second low-friction spacer.

9. The torque measurement system of claim 7, wherein the first low-friction spacer is made of a first dielectric material and the second low-friction spacer is made of a second dielectric material.

10. The torque measurement system of claim 1, further comprising:
    a spacer interposed between the first rotatable carrier structure and the second rotatable carrier structure,
       wherein the spacer is mechanically fixed to the first rotatable carrier structure, and wherein the at least one low-friction material is arranged between the spacer and the second rotatable carrier structure.

11. The torque measurement system of claim 1, further comprising:
a rigid spacer interposed between the first rotatable carrier structure and the second rotatable carrier structure,
wherein the at least one low-friction material is arranged between the rigid spacer and the first rotatable carrier structure and between the rigid spacer and the second rotatable carrier structure.

12. The torque measurement system of claim 11, wherein the at least one low-friction material is a low-friction coating disposed on the rigid spacer or disposed on the first rotatable carrier structure and the second rotatable carrier structure.

13. The torque measurement system of claim 11, wherein the at least one low-friction material includes:
a first low-friction spacer that is configured to provide a first low-friction mechanical contact between the first rotatable carrier structure and the rigid spacer, and
a second low-friction spacer that is configured to provide a second low-friction mechanical contact between the second rotatable carrier structure and the rigid spacer.

14. The torque measurement system of claim 1, wherein the at least one low-friction material is transparent to millimeter (mm)-waves such that the mm-waves are unaffected by the at least one low-friction material.

15. The torque measurement system of claim 1, further comprising:
a transmitter configured to transmit an electromagnetic transmit wave toward the mutually coupled structure, wherein the mutually coupled structure is arranged to convert the electromagnetic transmit wave into an electromagnetic receive wave based on the torque applied to the rotational shaft; and
a receiver configured to receive the electromagnetic receive wave and determine the torque applied to the rotational shaft based on the electromagnetic receive wave.

16. The torque measurement system of claim 15, wherein the torque-dependent coupling includes at least one of a capacitive near-field coupling, an inductive near-field coupling, a waveguide coupling, or a far-field coupling.

17. The torque measurement system of claim 15, wherein the torque-dependent coupling affects a millimeter (mm)-wave property of the mutually coupled structure such that the mm-wave property changes based on the torque applied to the rotational shaft.

18. The torque measurement system of claim 15, wherein:
the mutually coupled structure is configured to modify the electromagnetic transmit wave based on the torque-dependent coupling, thereby producing the electromagnetic receive wave having a parameter value that is unique to the torque applied to the rotational shaft.

19. The torque measurement system of claim 1, wherein, in response to the torque applied to the rotational shaft, the first metamaterial track and the second metamaterial track are configured to rotate about the rotational axis by differing amounts causing a torque-dependent shift in angular position between the first metamaterial track and the second metamaterial track and resulting in a torque-dependent change to the torque-dependent coupling.

20. The torque measurement system of claim 1, wherein the predetermined distance is a first predetermined distance, wherein the first rotatable carrier structure is mechanically coupled to the rotational shaft at a first point of attachment and the second rotatable carrier structure is mechanically coupled to the rotational shaft at a second point of attachment, and
wherein the first point of attachment and the second point of attachment are spaced apart by a second predetermined distance that is greater than the first predetermined distance.

21. The torque measurement system of claim 1, further comprising:
at least one spring configured to provide a compression force onto at least one of the first rotatable carrier structure or the second rotatable carrier structure to maintain the predetermined distance.

22. A method of determining a torque applied to a rotatable shaft, the method comprising:
providing at least one low-friction material between a first rotatable carrier structure coupled to the rotatable shaft and a second rotatable carrier structure coupled to the rotatable shaft;
providing a first metamaterial track on the first rotatable carrier structure such that the first metamaterial track is configured to rotate with the first rotatable carrier structure;
providing a second metamaterial track on the second rotatable carrier structure such that the second metamaterial track is configured to rotate with the second rotatable carrier structure, wherein the first metamaterial track and the second metamaterial track form a mutually coupled structure;
applying the torque to the rotatable shaft to induce a rotational shift of the first metamaterial track relative to the second metamaterial track, wherein the at least one low-friction material is configured to provide a low-friction rotational shift between the first rotatable carrier structure and the second rotatable carrier structure such that a predetermined distance between the first metamaterial track and the second metamaterial track is constant during the rotational shift of the first rotatable carrier structure relative to the second rotatable carrier structure;
transmitting an electromagnetic transmit signal toward the mutually coupled structure while the torque is applied to the rotatable shaft;
converting, by the mutually coupled structure, the electromagnetic transmit signal into an electromagnetic receive signal;
evaluating the electromagnetic receive signal; and
determining the torque applied to the rotatable shaft based on the evaluated electromagnetic receive signal.

23. A torque measurement system, comprising:
a first rotatable carrier structure mechanically coupled to a rotational shaft and configured to rotate about a rotational axis in a rotation direction;
a second rotatable carrier structure mechanically coupled to the rotational shaft and configured to rotate about the rotational axis in the rotation direction, wherein the second rotatable carrier structure is spaced apart from the first rotatable carrier structure;
a first metamaterial track coupled to the first rotatable carrier structure and configured to co-rotate with the first rotatable carrier structure, wherein the first metamaterial track is arranged at least partially around the rotational axis;
a second metamaterial track coupled to the second rotatable carrier structure and configured to co-rotate with the second rotatable carrier structure, wherein the second metamaterial track is arranged at least partially around the rotational axis, wherein the first metamaterial track and the second metamaterial track are spaced apart by a predetermined distance, wherein the first metamaterial track and the second metamaterial track are mutually coupled to each other by a torque-dependent coupling, thereby forming a mutually coupled structure, and wherein, in response to a torque applied to the rotational shaft, the first metamaterial track is configured to undergo a rotational shift relative to the second metamaterial track; and at least one structure arranged between the first rotatable carrier structure and the second rotatable carrier structure, wherein the at least one structure is mechanically not rigidly fixed to at least one of the first rotatable carrier structure or second rotatable carrier structure, wherein the at least one structure is configured to provide a low-friction rotational shift between the first rotatable carrier structure and the second rotatable carrier structure such that the predetermined distance is maintained constant during the rotational shift of the first rotatable carrier structure relative to the second rotatable carrier structure.

24. The torque measurement system of claim 23, wherein the at least one structure includes at least one bearing arranged in contact with at least one of the first rotatable carrier structure or the second rotatable carrier structure.

* * * * *